United States Patent
Gross

(10) Patent No.: US 8,442,923 B2
(45) Date of Patent: May 14, 2013

(54) TEMPORAL DOCUMENT TRAINER AND METHOD

(75) Inventor: John Nicholas Gross, San Francisco, CA (US)

(73) Assignee: John Nicholas Gross, Berkeley, CA (US)

( * ) Notice: Subject to any disclaimer, the term of this patent is extended or adjusted under 35 U.S.C. 154(b) by 1147 days.

(21) Appl. No.: 12/191,830

(22) Filed: Aug. 14, 2008

(65) Prior Publication Data

US 2009/0048990 A1   Feb. 19, 2009

Related U.S. Application Data

(60) Provisional application No. 60/955,775, filed on Aug. 14, 2007.

(51) Int. Cl.
    *G06F 15/18*   (2006.01)
(52) U.S. Cl.
    USPC ................................. 706/12; 707/725
(58) Field of Classification Search ............ 706/12; 707/725
    See application file for complete search history.

(56) References Cited

U.S. PATENT DOCUMENTS

| | | | |
|---|---|---|---|
| 5,418,951 A | 5/1995 | Damashek | |
| 5,794,178 A | 8/1998 | Caid et al. | |
| 6,038,561 A | 3/2000 | Snyder et al. | |
| 6,076,088 A | 6/2000 | Paik et al. | |
| 6,189,002 B1 | 2/2001 | Roitblat | |
| 6,263,335 B1 | 7/2001 | Paik et al. | |
| 7,013,308 B1 | 3/2006 | Tunstall-Pedoe | |
| 7,051,009 B2 | 5/2006 | Suermondt et al. | |
| 7,293,019 B2 | 11/2007 | Dumais et al. | |
| 7,366,711 B1 | 4/2008 | McKeown et al. | |
| 7,373,332 B2 | 5/2008 | Heumann et al. | |
| 7,451,120 B1 | 11/2008 | Kumar et al. | |
| 7,526,461 B2 | 4/2009 | Srinivasa et al. | |
| 7,526,462 B2 | 4/2009 | Sakurai et al. | |
| 7,599,938 B1 | 10/2009 | Harrison, Jr. | |
| 7,707,160 B2 | 4/2010 | Tunstall-Pedoe | |
| 7,818,659 B2 | 10/2010 | Kahn et al. | |
| 7,849,080 B2 | 12/2010 | Chang et al. | |
| 2002/0007364 A1 | 1/2002 | Kobayashi et al. | |
| 2002/0092019 A1 | 7/2002 | Marcus | |
| 2002/0123989 A1 | 9/2002 | Kopelman et al. | |
| 2004/0203636 A1 | 10/2004 | Chan et al. | |
| 2004/0261016 A1 | 12/2004 | Glass et al. | |
| 2005/0021490 A1 | 1/2005 | Chen et al. | |
| 2005/0060312 A1 | 3/2005 | Curtiss et al. | |
| 2005/0165743 A1 | 7/2005 | Bharat et al. | |

(Continued)

FOREIGN PATENT DOCUMENTS

WO   WO2008043082   4/2008

OTHER PUBLICATIONS

Gabrilovich et al ("Newsjunkie: Providing Personalized Newsfeeds via Analysis of Information Novelty" May 2004).*

(Continued)

*Primary Examiner* — Lut Wong
(74) *Attorney, Agent, or Firm* — Steven R. Vosen

(57) ABSTRACT

An electronic document sorter is trained to classify documents based on their temporal qualities. The invention can be used in environments such as automated news aggregators, search engines and other electronic systems which compile information having temporal qualities.

27 Claims, 20 Drawing Sheets

U.S. PATENT DOCUMENTS

| | | |
|---|---|---|
| 2005/0198068 A1 | 9/2005 | Mukherjee et al. |
| 2005/0203970 A1 | 9/2005 | McKeown et al. |
| 2006/0004691 A1 | 1/2006 | Sifry |
| 2007/0118521 A1 | 5/2007 | Jatowt et al. |
| 2007/0174279 A1 | 7/2007 | Jatowt et al. |
| 2008/0072247 A1 | 3/2008 | Barnard |
| 2008/0103882 A1 | 5/2008 | Lacomb et al. |
| 2008/0140621 A1 | 6/2008 | Martinez et al. |
| 2010/0161625 A1 | 6/2010 | Patterson |

OTHER PUBLICATIONS

Graff et al ("Many Uses, Many Annotations for Large Speech Corpora: Switchboard and TDT as Case Studies" Jul 200).*

Allan, James et al.; "Topic Detection and Tracking Pilot Study Final Report," to appear in Proceedings of the DARPA Broadcast News Transcription and Understanding Workshop, Feb. 1998, 25 pages.

Kleinberg, Jon; "Bursty and Hierarchical Structure in Streams," This work appears in the Proceedings of the 8th ACM SIGKDD International Conference on Knowledge Discovery and Data Mining, 2002, 25 pages.

Del Corso, Gianna et al.; "Ranking a Stream of News," International World Wide Web Conference archive Proceedings of the 14th international conference on World Wide Web, Chiba Japan, 2005, 10 pages.

Gulli, A.; "The Anatomy of a News Search Engine," International World Wide Web Conference archive Proceedings of the 14th international conference on World Wide Web, Chiba Japan, 2005, 2 pages.

Allan, James et al.; "First Story Detection in TDT is Hard," In Proceedings of the Ninth International Conference on Information and Knowledge Management, 2000, 8 pages.

Jatowt, Adam et al.; "Query-Based Discovering of Popular Changes in WWW," in Proceedings of the IADIS International Conference WWW/Internet 2003, ICWI 2003, Algarve, Portugal, Nov. 5-8, 2003, 8 pages.

Liebscher, Robert et al.; "Temporal Feature Modification for Retrospective Categorization," Proceedings of the ACL Workshop on Feature Engineering for Machine Learning in NLP, pp. 17-23, Ann Arbor, Jun. 2005.

Macskassy, Sofus; "New Techniques in Intelligent Information Filtering," Dissertation submitted to the Graduate School—New Brunswick Rutgers, The State University of New Jersey, Jan. 2003, 180 pages.

Makkonen, Juha; "Temporal information in Topic Detection and Tracking," University of Helsinki Department of Computer Science, 2004, 27 pages.

Luo, Gang et al.; "Resource-Adaptive Real-Time New Event Detection," International Conference on Management of Data, Proceedings of the 2007 ACM SIGMOD international conference on Management, Beijing, China, 12 pages.

Allan, James et al.; "News filtering topic detection and tracking," slideshow presentation, University Massachusetts, undated, 72 pages.

Gabrilovich, Evgeniy et al.; "Newsjunkie: Providing Personalized Newsfeeds via Analysis of Information Novelty," Proceedings of the Thirteenth International World Wide Web Conference 2004 (WWW 2004), May 2004, New York, NY., 9 pages.

Payne, Terry et al.; "Experience with rule induction and k-nearest neighbour methods for interface agents that learn," published in IEEE Transactions on Knowledge and Data Engineering, vol. 9 , Issue 2 (Mar. 1997), 8 pages.

Makkonen, Juha et al.; "Simple Semantics in Topic Detection and Tracking," Information Retrieval, 2004, 20 pages.

Scholz, Martin et al.; "Boosting Classifiers for Drifting Concepts," In Intelligent Data Analysis (IDA), Special Issue on Knowledge Discovery from Data Streams, 2007, 40 pages.

Smith, David.; "Detecting and Browsing Events in Unstructured Text," In SIGIR '02: Proceedings of the 25th annual international ACM SIGIR conference on Research and development in information retrieval, New York, NY, USA: ACM Press, 2002, 8 pages.

Doddington, G.; "Chapter 9:Topic Detection and Tracking," http://www.itl.nist.gov/iaui/894.01/tests/tdt/tdt99/presentations/index.htm, undated, 28 pages.

Stokes, Nicola; "Applications of Lexical Cohesion Analysis in the Topic Detection and Tracking Domain," thesis submitted for the degree of Doctor of Philosophy in Computer Science, National University of Ireland, Dublin, Apr. 2004, 276 pages.

Kleinberg, Jon; "Temporal Dynamics of On-Line Information Streams," In Data Stream Management: Processing High-Speed Data, http://www.cs.cornell.edu/home/kleinber/stream-survey04.pdf, 2006, 18 pages.

Swan, Russell et al.; "TimeMines: Constructing Timelines with Statistical Models of Word Usage," Papers of the ACM SIGKDD 2000 Workshop on Text Mining, 8 pages.

Toda, Hiroyuki et al.; "A Clustering Method for News Articles Retrieval System," International World Wide Web Conference Special interest tracks and posters of the 14th international conference on World Wide Web, Chiba, Japan, 2005, 2 pages.

Yang, Yiming et al.; "Topic-conditioned Novelty Detection," International Conference on Knowledge Discovery and Data Mining, Proceedings of the eighth ACM SIGKDD international conference on Knowledge discovery and data mining, 2002, 6 pages.

Yang, Yiming et al.; "A study on retrospective and on-line event detection," Annual ACM Conference on Research and Development in Information Retrieval, Proceedings of the 21st annual international ACM SIGIR conference on Research and development in information retrieval, 1998, 9 pages.

Stokes, Nicola; "Combining Semantic and Syntactic Document Classifiers to improve First Story Detection," Annual ACM Conference on Research and Development in Information Retrieval, Proceedings of the 24th annual international ACM SIGIR conference on Research and development in information retrieval, 2001, 2 pages.

Wagner, Earl et al.; "Anchoring News Events in Time," IUI'05, Month 1-2, 2004, 7 pages.

* cited by examiner

Temporal Change

FIG. 4A goose creek bomb - Google News                                                                                           Page 1 of 1

Web Images Video News Maps Gmail more ▼                                                                              Sign in

Google News [goose creek bomb] [Search] Advanced news search / Preferences

News results: Standard Version | Text Version | Image Version Results 1 - 3 of 3 for goose creek bomb. (0.03 seconds)

Browse Top Stories                        Sorted by relevance   Sort by date   Sort by date with duplicates included Last hour
Last day                   Bomb Scare in Goose Creek After Routine Traffic Stop
Past week                  WLTX.com, SC - 15 minutes ago
Past month                 Goose Creek, SC (WLTX) - Police in Goose Creek, SC are investigating a bomb scare.
Archives<sup>New!</sup>    Sources say a four-door sedan was stopped during a routine traffic ...

Blogs<sup>New!</sup>       Column: A few geese are good, a lot are not
                           Dowagiac Daily News, USA - Jul 26, 2007
                           Should they be bull-headed enough to hold out until September they're in for the ultimate
☑ News Alerts              awakening - goose hunting season. Then we'll see who owns what. ...

RSS | Atom                 Post 1 blasts its way into second round
About Feeds                South Carolina Now, South Carolina - Jul 20, 2007
                           Florence advances to play the winner of the Goose Creek/St. George series. "In my two
                           years here, this was the best series I've played in," said Florence ...
SC
News                       New! Get the latest news on goose creek bomb with Google Alerts.
Station

[goose creek bomb]        [Search]

Google - About Google News - Help Center - Help for Publishers - Terms of Use - Google Home

FIG. 4B
Page 1 of 2

Flight 101 missing

Transportation officials reported that Flight 101 bound from New York to London has lost contact with ground personnel. ...Apparently the flight crew reported a problem with smoke in the cabin some 15 minutes after departure. ....Efforts to contact the aircraft will continue.

Search Initiated

Rescue planes have begun searching the area where Flight 101 is believed to have gone down. ....The plane was carrying some 350 passengers....One of the people believed to be onboard is famous rockstar Stink....

Rescue Planes Detect Debris in Water

Searchers have spotted what appears to be various forms of debris and wreckage of an airplane in the water some 100 miles offshore. ... .Search and rescue teams are looking for survivors.....

Survivors found from airplane

Emergency personnel report that they believe they have now found the main wreckage of flight 101 ..... A number of survivors are also visible in the water .....The cause of the crash is still unknown....

Rescue Operation Underway

Coast guard ships and aircraft report that they have located and safely retrieved at least 150 passengers from Flight 101... At least 100 persons are still missing.....Rockstar Stink was also rescued and is reported to be sober for the first time in several weeks....efforts continue to try and locate the plane's black box to unravel the mystery of what happened to the plane

FIG. 4B
Page 2 of 2

Update on Crash ⌐486
⌐481

Officials now report that they have completed rescue operations at the crash ⌐481
site, having recovered some 185 persons in the past 2 days.....at least 65
people perished during the crash.....additional efforts to recover other remains
will continue as weather conditions permit as a storm is expected in the area in
the next day or so....officials believe they have located the black box but have
not attempted to retrieve the same at this time... ⌐481

Black box found ⌐487
⌐481

TSA officials have announced that they found Flight 101's black box some
2000 feet at the bottom of the Atlantic...... An automated diving robot has
retrieved the device and it is being transported back to TSA headquarters later
today as conditions permit. ⌐481

Analysis of crash ⌐488  ⌐481

Final review of the black box of Flight 101 reveals that the plane suffered an
electrical failure shortly after take off.....some 188 persons were rescued but at
least 60 persons died in the accident... ⌐481
⌐481

488 — Elections today in California ⟵ 481

Candidates for today's election for Governor in California include Mr. A, Mrs. B and Ms. C.....Mrs. B is the favorite to win.... Polls will open at 7:00 a.m. and close at 7 p.m.
⟵ 481

Predictions for election ⟵ 481

489 — Polls are now open in California in the election for Governor.... Exit polling shows that a majority of voters are favoring Mrs. B.
⟵ 481

Polls closed in California Governor's race ⟵ 481

490 — Voting in California's Governor's race is now officially over..... Early returns in isolated areas of 5% of precincts shows Mr. A with a slight lead over his contenders.... The current vote tally is: 1500 for Mr A; 1200 for Mrs. B; 500 for Ms. C.
⟵ 481

Race in California heating up ⟵ 481

491 — With 50% of the precincts reporting, Mr. A is clinging to a narrow margin over Mrs. B and Ms. C..... the vote count so far is 14500 for Mr. A, 13500 for Mrs. B and 4000 for Ms. C. A final tally is expected much later this evening.
⟵ 481

Race too close to call

492 — The race for California's governorship is extremely tight between Mr. A and Mrs. B.... At this time Mr. A still leads in the vote over Mrs. B by a margin of less than 200 votes... So with 98% of the precincts counted, the tally is Mr. A: 27500; Mrs B 27310; Ms. C: 7500. Despite the current tally projects Mrs. B to win on the strength of uncounted inner city votes.
⟵ 481

Final tally of race in California

493 — ⟵ 481

All the votes are counted in California and the new Governor elect is Mrs. B with a final tally of 29300 votes to 28888 votes for Mr. A. Ms. C finished in third place with 8200.
⟵ 481

FIG. 4D

494 — Big Football Game Slated for Sunday
481 —
ABC University and XYZ Tech are scheduled to kick off at 5:00 p.m. on Sunday.... The Beavers, led by their Quarterback Jay Studdo are heavily favored to win....

495 — Live score from Big Game
481 —
In the ABC – XYZ matchup the visitors have scored first and lead the game 7 – 0 on a rushing touchdown by Joe Bob Duncan.....
481 —

496 — Half-time at Big Game
481 —
Intermission has arrived at the ABC – XYZ game, and the home team is now leading 17 – 10.

497 — ABC clings to lead late in the game
481 —
At Big Stadium the game is very close; with only 3 minutes to go ABC is hanging on to a 27 – 24 lead.
481 —

498 — XYZ stuns ABC in Big Game
481 —
Joe Bob Duncan scored with 5 seconds left to lead XYZ to a 31 – 27 victory over ABC University.
481 —

FIG. 5A goose creek bomb - Google Search                                         Page 1 of 6

Web Images Video News Maps Gmail more ▼                                     Sign in Google
      [goose creek bomb              ] [Search] Advanced Search
                                                        Preferences
                                         New! View and manage your web history Web                              Results 1 - 50 of about 296,000 for goose creek bomb. (0.13 seconds)

wltx.com | Bomb Scare in Goose Creek After Routine Traffic Stop
News 19, local news, weather, programming, sports, consumer information, family, Doppler
radar, hurricane, jobs, On Your Side, video, Gamecocks.
www.wltx.com/news/story.aspx?storyid=52237 - 52 minutes ago - Similar pages

ABC News 4 Charleston - Explosives Found Near Goose Creek; FBI on ...
Highway 1-76 near Goose Creek has since been shut down. In addition to the FBI
(website) ... The Charleston County bomb squad has also been called. ...
www.abcnews4.com/news/stories/0807/444994.html - 4 hours ago - Similar pages

Dustin Allan Yancey, Private First Class, United States Army
Private First Class Dustin A. Yancey, 22, of Goose Creek, South Carolina ... Dustin Allan
Yancey, 22, was driving an armored Humvee when the bomb exploded ...
www.arlingtoncemetery.net/dayancey.htm - 16k - Cached - Similar pages

James M. Gurbisz, Captain, United States Army
    Gurbisz and Private First Class Dustin A. Yancey, 22, of Goose Creek, .... James Gurbisz
    was killed when a roadside bomb exploded near his Humvee while on a ...
    www.arlingtoncemetery.net/jmgurbisz.htm - 19k - Cached - Similar pages

Charleston Police Find Vehicle Loaded With Explosives
Police in Goose Creek are investigating a bomb scare. Highway 176 near Crowfield
Boulevard and Old Mt. Holly Road has been shut down. ...
www.freerepublic.com/focus/f-news/1876505/posts - 1 hour ago - Similar pages

Explosives Found Near Goose Creek SC; FBI on Scene
    Goose Creek - Berkeley County police pulled over a light colored van in a ... KEYWORDS:
    banglist; bomb; homelandsecurity; jihadinamerica; leo; terror ...
    www.freerepublic.com/focus/f-news/1876514/posts - 1 hour ago - Similar pages
    [ More results from www.freerepublic.com ]

SNIFFER DOGS, POLICE DOGS, DRUG DOGS, NARCO DOGS, DRUG DETECTION ...
Drugs Goose Creek RexCurry.net rexcurrydotnet ..... college basketball championship,
after a hot dog cart attracted the attention of a bomb-sniffing dog. ...
rexcurry.net/drugdogsmain.html - 45k - Cached - Similar pages

AAU Baseball: All Tournament Team
Kenny Bryant, Goose Creek Diamondbacks. Tyler Hill, Goose Creek Diamondbacks ...
Auston Godsey, Bomb Squad. Tony Caldwell, Central Florida Silver Eagles ...
www.aaubaseball.org/pages/2004/all-tournament-team.html - 73k - Cached - Similar pages

[PDF] Goose Creek CISD Goose Creek CISD Student Code of Conduct Code of ...
File Format: PDF/Adobe Acrobat - View as HTML
Acknowledgement Form) that they have received and read the Goose Creek Student .....
engages in conduct relating to a false alarm or report (including bomb ...
www.gccisd.net/.../Handbooks%20and%20Discipline/discipline-CodeofConduct-a.pdf -
Similar pages

Patrick L Archibald
Authorities from Goose Creek, Berkeley County, and South Carolina Law Enforcement

FIG. 7
Prior Art News Aggregator

Google News

Edition:
U.S.

Section:
☐

Stories: 3     Delete section ☐

[Save changes] [Cancel]

---

Tiki's 3 TDs likely seals playoffs for Giants
MSNBC - 15 hours ago
Nick Wass / AP. LANDOVER, Md. - In what could have been his career finale, Tiki Barber ran for a franchise-record 234 yards and three touchdowns to give the New York Giants a probable spot in the playoffs with a 34-28 victory over the Washington Redskins.
Saving his Best for Last GiantInsider.net (subscription)
Redskins fall to Tiki and the Giants San Jose Mercury News
New York Daily News - Forbes - Los Angeles Times - Washington Post
all 588 news articles »

News 14 Charlotte

Georgia-Virginia Tech Preview
USA Today - 18 hours ago
Virginia Tech and Georgia both stumbled early this season, but they're each heading into the postseason on a roll. The 14th-ranked Hokies and the Bulldogs will each look to build on their momentum when they ...
Virginia Tech hands a gift to Georgia San Jose Mercury News
Georgia tops Virginia Tech in the Chick-fil-A Bowl Seattle Post Intelligencer
Boston Globe - Online Athens (subscription) - Houston Chronicle - ABC News
all 448 news articles »

Twin Falls Times-News

What the managers said
Eurosport - 10 hours ago
Jose Mourinho had some harsh words about his defensive personnel Game already over

---

Los Angeles Times - CTV.ca - Dallas Morning News (subscription) - The State
all 1,886 news articles »

With tourism at a peak, Times Square hits stride for New Year's
International Herald Tribune - 15 hours ago
AP. NEW YORK: An incalculable number of revelers will flood Times Square Sunday evening for a celebration that will wash away thoughts of world conflict with a tumult of music, glitz and celebrity star power.
New Year's Eve specials dominate the TV dial Houston Chronicle
Times Square Readied For New Year's Eve Playfuls.com
NDTV.com - Belleville News-Democrat - NY1 - MLive.com
all 280 news articles »

NY1

Indiana Jones 'to return in 2008'
BBC News - Dec 30, 2006
Director George Lucas says the fourth instalment in the Indiana Jones film series will start next year. Lucas said he and Steven Spielberg had recently finalised the script, and promised it was "the best one yet".
Fourth 'Indiana Jones' Movie to Start Filming in 2007 FOX News
George Lucas plans to shoot fourth "Indiana Jones" movie in 2007 San Jose Mercury News
CBC British Columbia - Actress Archives - The Observer - New York Daily News
all 297 news articles »

Playfuls.com

[Show more stories] [Show fewer stories]

More Top Stories     edit

Schwarzenegger out of hospital, back to business - People

California Governor Arnold Schwarzenegger works from his hospital bed at St. John's Health Center in Santa Monica, California on December 28, 2006. The Governor checked into the hospital on December 26 for surgery on his leg after he fractured his femur on December 23 while skiing on Bald Mountain in Sun Valley, Idaho. (UPI Photo/Governor's Press Office)

"Femur schmemur" is what hard worling Governor Schwarzenegger says as he bolts out his hospital bed and is determined to commence work and address his busy schedule including the swearing in ceremony for a second term, which he won in a landslide.

California Gov. Arnold Schwarzenegger was released after four days when he underwent surgery to repair a fractured leg suffered while skiing. In a 90-minute operation last Tuesday, doctors at St. John's Health Center used screws and cables to link the broken fragments of the bone.

Schwarzenegger fractured the largest bone in his body, his femur, while skiing a challenging run with family in Sun Valley, Idaho. The Governator is expected to be on crutches while he is sworn in for second term. The expected recovery will take about eight weeks. ◄

The governor left the hospital about 5 p.m. local time Saturday and traveled to his home in Los Angeles, Schwarzenegger spokeswoman Julie Soderlund said.

In a press statement released by his office Saturday night, Schwarzenegger said the injury had not dampened his optimism for the coming year.

Schwarzenegger's two-day inauguration festivities will include a kickoff party, legislative luncheon, swearing-in ceremony and black-tie gala, all beginning this coming Thursday.

He is scheduled to deliver his State of the State address on Jan. 9th, and present his budget proposal January 10th.

Talkback

There are currently no comments for this article. Be the first to comment!

Additional Headlines

- Schwarzenegger out of hospital, back to business

FIG. 8C
Prior Art Page 1 of 2

FIG. 8C
Prior Art Page 2 of 2

"From the hospital I am preparing for my State of the State address, meeting with members of my staff and working on the state budget," Mr. Schwarzenegger says in a statement issued by his office along with two photos Thursday.

"I am also looking forward to my inauguration to a second term as your Governor - even if it means I have to walk into my swearing-in ceremony on crutches," he says.

That's likely, say his doctors. "The surgical repair to his femur requires three days of hospitalization, followed by about eight weeks of using crutches.

On Thursday, the governor conducted meetings with members of his staff via videoconference from his hospital room," his office says.

Premier Guide — Local Search, Made Easy

Top Current Search Premium Policies Advertising Laskin Weather
Subscribe Account About CVBT Contact Home Copyright Central Valley Business Times © 2006
Central Valley Business Times is an online unit of BizGnus, Inc.

FIG. 9
Prior Art sharks hockey score - Google News

Sign in

Google News — Web  Images  Video  News  Maps  more »

[ sharks hockey score ]  [ Search News ]  [ Search the Web ]   Advanced news search
Preferences Results 1 - 10 of about 336 for sharks hockey score. (0.23 seconds)

Sorted by relevance   Sort by date

→ *News Search Engine Sort by Relevance*

| Top Stories |
| World |
| U.S. |
| Business |
| Sci/Tech |
| Sports |
| Entertainment |
| Health |
| Most Popular |

✉ News Alerts

RSS | Atom
About Feeds

Mobile News

About
Google News

Sharks facing plenty of problems in new year
Worcester Telegram, MA - 20 hours ago
Of the American Hockey League's 27 teams, the Sharks ... in less than half a season, the Sharks have a ... Chicago and San Antonio combined to score four goals in ...

Agitated Sharks Douse Flames
International News Service, Australia - 21 hours ago
... which earned him a postgame interview on "Hockey Night in ... Goc and Milan Michalek vaulted the Sharks into the ... nights he's not even trying to score," Wilson said ...

2006 Year in Review
Central Peace Signal, Canada - 11 hours ago
... in the final game by a 3-2 score. ... all won medals in either speedskating, wrestling and hockey. ... The Rycroft Bantam Sharks and Spirit River Midget Rangers ...

Smyth has goal in first game back with Edmonton Oilers
Brooks Bulletin, Canada - 11 minutes ago
... He doesn't score from the ... His hockey resume is built on playing through pain, highlighted by ... second-round playoff series against the San Jose Sharks this spring ...

FIG. 9A
Prior Art sharks hockey score - Google News

Sign in

Google News — Web  Images  Video  News  Maps  more »

[sharks hockey score] [Search News] [Search the Web]

Advanced news search
Preferences

Results 1 - 10 of about 334 for sharks hockey score. (0.14 seconds)

Sort by relevance  Sorted by date ← *News Search Engine Sort by Date*

| Top Stories |
| World |
| U.S. |
| Business |
| Sci/Tech |
| Sports |
| Entertainment |
| Health |
| Most Popular |

✉ News Alerts

RSS | Atom
About Feeds

Mobile News

About
Google News

Smyth has goal in first game back with Edmonton Oilers
Brooks Bulletin, Canada - 12 minutes ago
... He doesn't score from the ... His hockey resume is built on playing through pain, highlighted by ... second-round playoff series against the San Jose Sharks this spring ...

Smyth has goal in first game back with Edmonton Oilers
CBC News, Canada - 14 minutes ago
... He doesn't score from the ... His hockey resume is built on playing through pain, highlighted by ... second-round playoff series against the San Jose Sharks this spring ...

Smyth has goal in first game back with Edmonton Oilers
570 News, Canada - 27 minutes ago
... He doesn't score from the ... His hockey resume is built on playing through pain, highlighted by ... second-round playoff series against the San Jose Sharks this spring ...

TEMPORAL DOCUMENT TRAINER AND METHOD

RELATED APPLICATION DATA

The present application claims the benefit under 35 U.S.C. 119(e) of the priority date of Provisional Application Ser. No. 60/955,775 filed Aug. 14, 2007 which is hereby incorporated by reference. The application is further related to the following applications, all of which are filed on this same date and incorporated by reference herein:
Temporal Document Sorter & Method; Ser. No. 12/191,809;
News Aggregator and Search Engine Using Temporal Decoding; Ser. No. 12/191,896;
Location Based News and Search Engine; Ser. No. 12/191,916;
Temporal Document Verifier & Method; Ser. No. 12/191,927;
User Based Document Verifier & Method; Ser. No. 12/191,941;
Event Based Document Sorter & Method; Ser. No. 12/191,951;
Temporal Document Sorter & Method Using Semantic Decoding and Prediction; Ser. No. 12/191,973; and
Temporal Based Online Search & Advertising; Ser. No. 12/191,999.

FIELD OF THE INVENTION

The present invention relates to electronic systems and methods for training automated machine classifiers so they can differentiate document content, particularly in the temporal domain. The invention has particular applicability to news aggregators, search engines and other automated systems where is it desirable to sort and compile content in chronological order.

BACKGROUND

Internet based news aggregators are well-known in the art. An example of a contemporary system is that provided by Google at its News site, shown generally in FIG. 7. Google News automatically gathers stories from an assortment of news sources worldwide, and automatically arranges them into a variety of categories/topics as shown in FIG. 7. Typically speaking systems such as this are designed to present what they deem the most relevant stories within the interface shown in FIG. 7, using automated algorithms which measure human interest/relevance of individual news stories. This is done primarily by identifying a number of factors, including determining the quality of the source of the news, page views, search queries and personal preferences as explained in US Publication Nos. 20050165743; and 20050060312; all of which are incorporated by reference herein.

Google News also automatically updates the topics and news stories on a periodic basis. One limitation of such system, however, is that there is no (apparent) discrimination made by the Google news algorithm to sort the stories in actual chronological order within the main news page. For this reason, as seen in FIG. 7, the main story highlighted for the Georgia-VA Tech football game is entitled "Preview" and is dated some 18 hours ago. In fact, the story beneath such highlighted entry is more recent and gives the actual outcome of the contest: Georgia in fact has already won the game. Accordingly the Google News aggregator, while compiling relevant content, tends to accumulate a lot of stale content which is not very timely but which nonetheless is prominently displayed because of the algorithm computes importance.

At the same time it should be noted that by selecting the entry in FIG. 7 one can see a more comprehensive listing of stories from the news aggregator, including a chronological sort of the same. However even this aspect of the aggregator has limitations, because while the news stories are identified by their release time (i.e., 1 hour ago), this parameter is not in fact helpful for identifying the actual temporal quality of the content of certain stories. This is because many news agencies/sources release stories which merely duplicate content from earlier stories, and with little or no new added content relevant to a story therein. These repeated stories can bear a recent time stamp and thus be pushed (incorrectly) to the top by the Google temporalizer to suggest that they are very recent.

An example of the duplication of content can be seen in FIG. 8, in which the top four stories, as sorted by the Google chronologizer, actually contain identical content even though they were time stamped with different recency values. This figure also shows that these four stories actually duplicate content dealing with the governor of California which was already first extracted some hours earlier from the Salon news source. FIG. 8 also depicts the problem noted above, namely, that the story shown with the dashed arrow (from Monsters & Critics) actually has newer content not found in the identified most recent articles. This can be confirmed from examining FIGS. 8A and 8B; the M&C article clearly evidences additional recent content relating to the governor's hospitalization.

The effect is particularly pronounced during the time in which certain events (or their reporting), such as sporting events, elections, natural catastrophes, accidents, are taking place. That is, the updating of scores is something that tends to lag significantly behind other stories. This makes it hard to review the news at a glance and immediately identify the current state of the certain events.

The situation is exacerbated by overseas news bureaus which pick up US news stories and then repeat them verbatim at a later time. For instance a sporting event may start at 5 p.m. PST in the US and end at 8 p.m. The news then is disseminated overseas, and then reported on by several foreign sources during their respective days. So as a practical matter, at 11:00 a.m. PST the next day, the foreign news source stories describing the kick-off the game (not the result) are just being published fresh in their respective domains. From the perspective of the Google type algorithms, which only appear to examine explicit time references, the foreign stories describing the beginning of the game appear more recent than stories describing the result. The result is an aggregation of content that is mismatched in time.

Moreover the same lack of temporal relevance problem also exists with search engines purporting to render relevant results to users. While such systems typically include some mechanism for selecting "recent" content, there is no mechanism available to ensure that such content is indeed fresh and not simply a repeat of older, stale material. A similar situation can be found in the Blogsphere as well, where it is not easy to determine the actual temporal relevance of material.

An example of this problem is seen in FIGS. 9 and 9A of the prior art. Here a query made to "Sharks Hockey Score" late in the evening on December 28 reveals nothing useful in fact concerning the game which has just completed against their opponent of the evening: Phoenix. No matter how the stories are sorted, by relevance or date, there is no information about the game which the subscriber can glean, even though the game had concluded and at least one news source had reported the final score.

To get such information one must leave the news aggregator and visit another site, a fact, of course, which is undesirable from the perspective of trying to maintain the user's attention on the news aggregator. The problem is exacerbated with smaller computing devices and cellphones as well, where display space is limited.

Accordingly there is clearly a long-felt need for a temporal-based document sorter which is capable of addressing these deficiencies in the prior art.

SUMMARY OF THE INVENTION

An object of the present invention, therefore, is to overcome the aforementioned limitations of the prior art.

Accordingly one aspect of the invention concerns a system and method of automatically classifying temporal characteristics of electronic documents with a computing system.

Another aspect concerns automatically sorting electronic documents by their temporal characteristics.

A further aspect of the invention is directed to automatically training an electronic document sorter to classify documents.

Still other aspects of the invention concern comparing electronic documents to identify content differences, content matches, and temporal differences.

Another aspect of the invention is directed to automatically presenting electronic documents in accordance with their temporal characteristics to users, including on search engines, news aggregators, etc.

Yet other aspects of the invention concern processing search queries in accordance with temporal characteristics of documents.

A further aspect of the invention concerns identifying events and locales in news stories, to determine appropriate ordering and content sources for stories.

Another aspect of the invention involves automatically verifying temporal values of electronic documents through additional third party sources, including human contributors.

Other aspects of the invention involve automatically identifying and using human contributors for news/temporal content, including determining optimum participants for such contributions. Related to this aspect are interfaces, websites and other tools designed to facilitate collection of ranking data from volunteers.

More specific aspects of the invention are concerned with collecting content for news stories, particularly sports, financial, election, disaster and other stories, and presenting such in a manner designed to give the most up to date status information for such events.

Another aspect of the invention is the use of semantic information to contribute to the temporal decoding, sorting and presentation of content.

A further aspect of the invention involves the classification of news stories, and the prediction of related developments expected for such stories.

Yet another aspect concerns automated advertising that relies upon and uses temporal information to enhance online ad auctions, advertising placement and search engine behavior.

These aspects of the invention (and others described herein) are preferably implemented as one or more computer software routines embodied in a tangible media and adapted to cause one or more computing systems to perform the required operations.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. While described in the context of news aggregators, search engines, blog compilers and related systems, it will be apparent to those skilled in the art that the present teachings could be used in any Internet based system in which it is desirable to identify, compile and present documents based on a temporal ordering.

DESCRIPTION OF THE DRAWINGS

FIG. 4A illustrates one aspect of the invention which optimizes the use of local sources for news items;

FIGS. 4B, 4C and 4D illustrate examples of the preferred approach for parsing and analysis of temporal components of electronic documents in accordance with teachings of the present invention;

FIG. 5A illustrates one aspect of the invention which optimizes the use of local sources for verifying temporal aspects of events;

FIGS. 7, 8, 8A, 8B, 8C, 9 and 9A depict content presented by an operation of a prior art news aggregator and search engine;

DETAILED DESCRIPTION

The present invention is concerned with identifying temporal differences between documents, which typically are manifested in the form of some form of content differences between documents. A "document" as used herein is intended to be understood in the broadest sense to include human or machine perceivable materials in electronic form. While text-based documents are described herein with respect to a preferred embodiment, it will be understood that other applications of the invention could be employed in other domains to include audio and video information. In such latter cases the invention can be used to operate on text data extracted from audio content (such as by transcriptions or voice recognition) tags describing such multimedia files (auto generated or contributed by human reviewers) or other metadata associated with such files that can be analyzed temporally.

The content differences may in turn be defined as either: 1) net content additions or deletions; and/or 2) content semantic variations relating to an ongoing event or story suggesting a temporal change. These content differences, while not perfect indicators of course of temporal qualities of documents, are nonetheless strong indicators which can be exploited to compile and sort large numbers of documents such as utilized at news aggregators, search engine indices, blog search indices, RSS feeds, etc.

Figure 2:
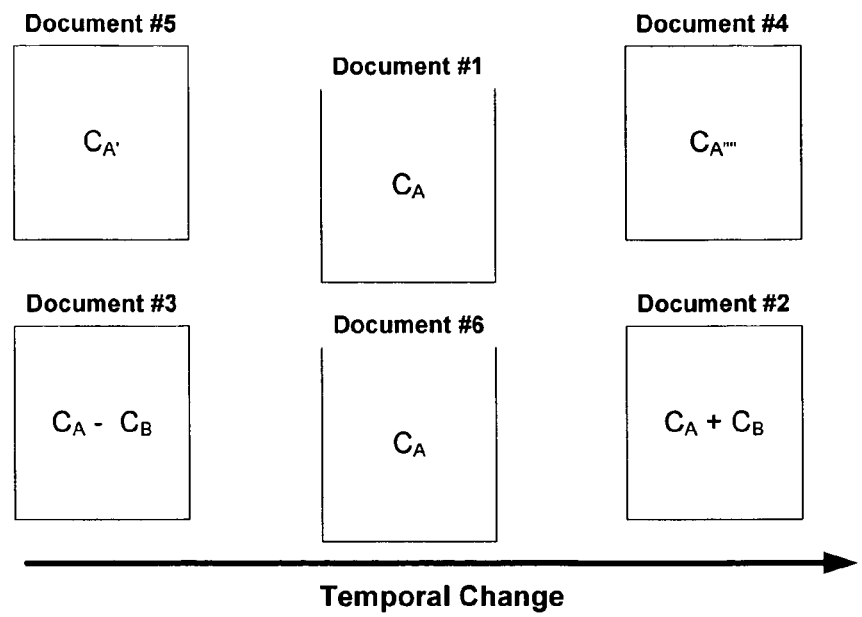
FIG. 2 illustrates a preferred basic sorting process performed by embodiments of the present invention to classify documents and sort them in a temporal sequence.

For example, assume a document #1 has a certain content $C_A$-designated collectively as a text string {A1, A2 .... Ax} where An represents individual words. The latter make up individual sentences S1, S2, etc. As seen in FIG. 2, later reportings on such story typically augment such content directly, to result in a combined content document #2 containing $C_A+C_B$, where $C_B$ is an additional text string {B1, B2, ... By} of additional sentences. This additional text string may be simply appended or embedded in different ways within the original content.

In any event, a person seeing a new document #2 with combined content $C_A+C_B$ would perceive such to be a superset of the content of the original #1 and thus for purposes of the present discussion such can be treated as a later edition of the original. Stated another way, the existence of new data/content in document #2 can be associated with the creation of new information which occurred—most likely—at a later time.

Similarly, some reportings may intentionally abridge or be earlier versions of the original story and thus a document #3 may evince a combined content $C_A-C_B$. Again a human observing document #3 with combined content $C_A-C_B$ would perceive such to be a subset of the content of the original #1 and thus for purposes of the present discussion document #3 can be treated as an earlier edition of the original.

Other documents, such as documents #4 and #5, may contain very similar content $C_{A'}$ or $C_{A''}$ to document #1 but differ semantically in a manner which is temporally significant and helps to identify a temporal order. This is explained more fully below, but a quick example would be a story reporting on an ongoing sporting event. In such case the text of the story may be almost identical except for the difference in time of the contest, the score, and other similar contest related parameters. Thus if story #1 reported that the score of the Georgia-Virginia football game was 10:0, and story #4 reported the score as 10:3, it is natural to classify document #4 as reflecting more recent information. The existence of other semantic variations can be used effectively to interpret a temporal rating for documents containing similar content directed to a topic that is a future event, an ongoing event, or an ongoing evaluation of a prior event.

Furthermore, certain types of stories can be divided logically into temporal classifications based on their underlying nature. For example, a developing story with respect to a terrorist investigation may proceed roughly as follows:

1) Bomb alert issued;
2) plot uncovered;
3) suspects detained;
4) suspects identified;
5) plot details revealed, etc.

Since this is a very common sequence, it is clearly useful to be able to differentiate and classify documents accurately with respect to this type of logical order which translates into a temporal sequence. If during a review of documents therefore it is found that document #1 is related to a bomb alert therefore, and document #4 updates such story with more plot details relating to the alert, then it can be safely assumed that the latter contains more recent information.

Similar examples can be found in other fields; for example, in the business field, a number of people are keenly interested to know whether the Fed chairman has actually raised rates. Prior to such announcement there are typically dozens of stories predicting such event. The ability for a system to cleanly and quickly identify the actual decision event is extremely useful. The same is true with respect to company earnings and similar financial event reportings.

High profile court trials also present a similar logistical challenge, because a significant amount of press is created prior to the announcement of the verdict. The latter is buried in a sea of noise until enough people have read the result to make it relevant enough to the news aggregator. By such time it is often no longer "news" in the contemporary sense.

Finally some documents, such as document #6 may be effectively identical duplicates of original document #1. This scenario is explained above in connection with the prior art system. Both documents evince the same temporal value with respect to a particular event, even if they were not both created at the same time.

These scenarios define a rough temporal change scale shown in the bottom of FIG. 2. This is not intended to be exhaustive and it will be understood that other formulations of content comparisons could be developed and placed along this temporal scale.

Figure 1:
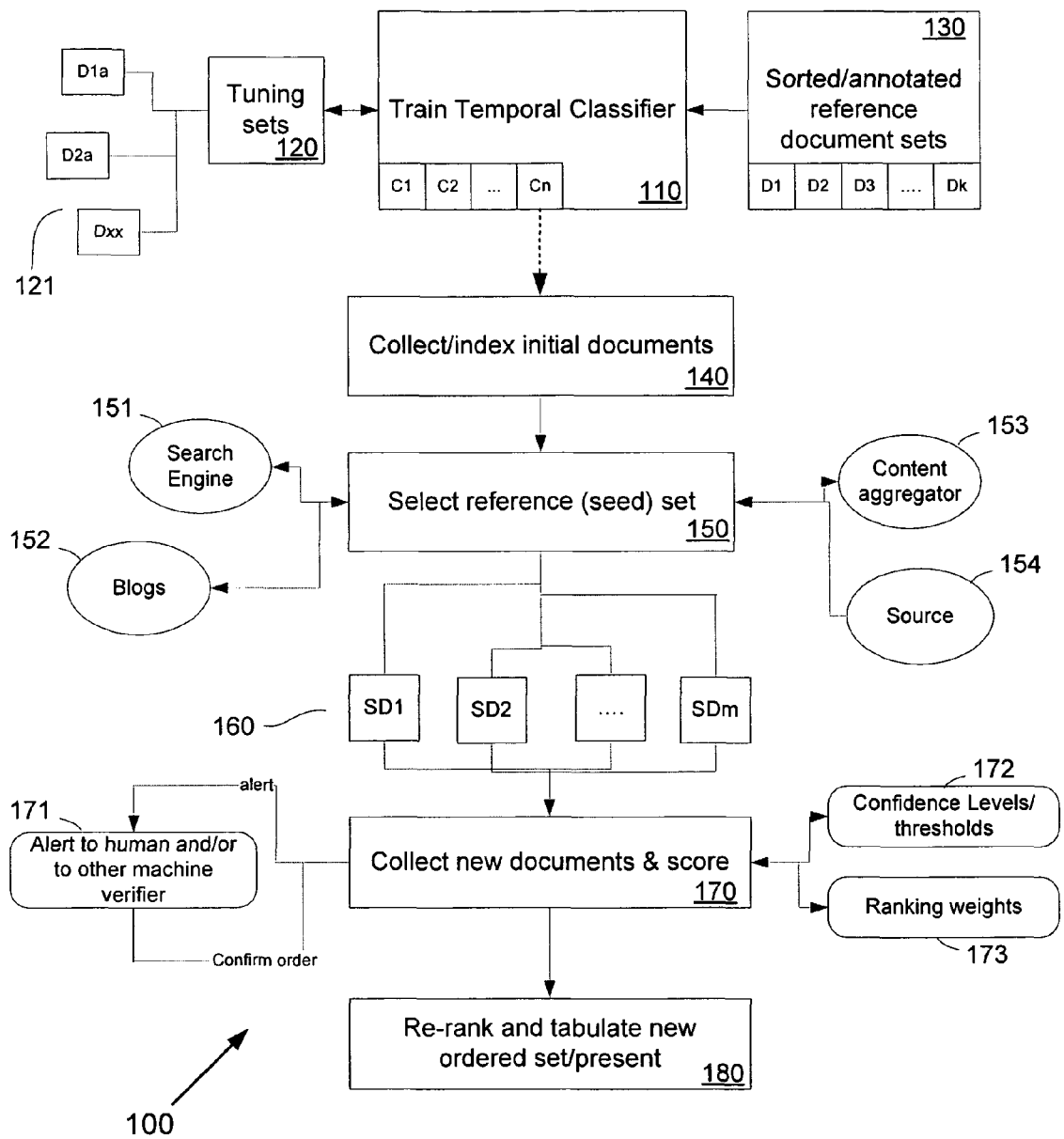
FIG. 1 is a flow chart illustrating the preferred steps performed by a document temporalizing system and process implemented in accordance with preferred embodiments of the present invention.

FIG. 1 depicts a process 100 employed by preferred embodiments of the present invention to identify and sort documents in a temporal order. A temporal classifier training step 110 is performed based on a tuning set 120 and documents 121. The temporal classifier is preferably an artificial intelligence software routine, such as a natural language engine executing on a computing system.

The temporal classifier preferably can be configured in the form of a term destination-matrix, in a manner typically used in so-called vector-based call routing used in speech recognition/routing systems and related systems. These systems work by transcribing calls made by humans to live operators who then interpret the spoken utterances and then interpret the caller's request by directing them to a specific department, person, etc. The basic theory is that the system breaks down the user calls into distinct groups of words that it then begins to associate with individual destinations. By analyzing a sufficiently large number of samples eventually the system develops enough examples to compile a term-destination matrix, which allows for dissecting new calls and matching them, based on their content overlap, to prior decoded calls made to the system.

The same phenomenon is studied in search engines as well, in that user queries are logged along with the results presented in a search list. The user's selection of entries from the search list is then also evaluated to develop correlations for later users' searches. When a later search is made against the same search terms by a different user the search engine factors in some weighting for the results based on the prior observed behavior for the prior user.

This same principle can be applied in the present invention as well. The main difference in the present application is that the terms are derived from analyzing documents such as news stories or web pages instead of caller transcriptions. Determining the "category" of a new document is a relatively straightforward exercise well-known in the art, and the aforementioned vector based approach would be one option. Other techniques will be apparent to those skilled in the art. The destinations in this instance are the temporal classifications, so that the documents are sorted effectively into individual bins representing a distinct temporal interpretation value for individual categories.

Thus for a set of categories (C1, C2, . . . Cn) the natural language engine is trained by presenting a set of documents relating to the individual categories. For example, documents D1*a* may pertain to sports, particularly hockey events. D2*a* may pertain to business, particularly company earnings events, and so on. These documents are collected through any convenient mechanism and developed into tuning sets 120 which are used to teach the classifier how to interpret documents from a temporal perspective. The tuning sets are preferably developed by culling stories pertaining to the particular topics, and compiling examples of different distinct temporal characteristics. For example, in the aforementioned situation of hockey sporting events, the tuning set may contain a set of K distinct documents representing K distinct temporal values in chronological order, ranging from an oldest to a most recent story pertaining to a hockey sporting event. The content of the K stories is again preferably selected to accurately convey the temporal level/value to be associated with the story. For instance, a first (oldest) story may contain content directed to a "preview" of the "upcoming match" at a particular date/time. A second story may comment on the expected team lineups, last minute scratches of players, and current rink conditions. A third story may describe the score at the end of the first period of play, along with shots on goal, penalties, etc. A fourth story may describe the final score of the game with complete stats. A fifth story may provide a re-cap of the game, along with quotes from the players, coaches, etc. These are but examples of course, and it will be understood that the temporal classifications may be more coarse or granular depending on the particular field of interest.

The temporal classifications can be set up in advance or determined automatically from analyzing large collections of documents. They can be used, for example, to create rough cuts/divisions of other sets of documents whose temporal qualities are not known ab initio. Furthermore they can assist in determining an approximate initial temporal value for documents of particular categories.

Then the documents are sorted/annotated at step 130 by a combination of both human and machine logic if desired. The benefit of employing a human operator during this training step is that they can more easily resolve ambiguities in temporal order. The sorted/annotated reference document sets (D1, D2, D3 . . . Dk) represent large collections of documents which can be used later as a reference or benchmark to help interpret and classify the temporal qualities of a new document. The sorting can also be based on automated observations of humans reviewing documents having different temporal order, to determine a sequence that such persons used in reviewing such materials. Since most people are expected (or can be easily trained) to review content in chronological sequence, this can be another source of temporal reference.

At step 140 information about the individual collections (D1, D2, etc.) can be stored in a table such as the following:

| Category N | | | |
|---|---|---|---|
| Documents | Term Vector | Keywords | Temporal Interpretation |
| Pa1, Pa2, Pa3 . . . Pan | Vfirst | Wa1, Wa2, Wa3 . . . | $T_{first}$ |
| Pb1, Pb2 . . . | V1 | Wb1, Wb2 . . . | $T_1$ |
| . . . | | . . . | . . . |
| Plast1, Plast2 . . . | Vlast | Wlast1, Wlast2 . . . | $T_{last}$ |

In other words, the natural language engine can process the documents which are correlated to a particular temporal interpretation to extract keywords which best represent or signify the presence of a document within such temporal order. For example in the context of a sports category for hockey, the keywords for different temporal interpretations may include the terms discussed above, such as {(team name), preview, upcoming, face-off, start-time, expected team lineups, injury scratches, rink conditions, shots on goal, penalties, losing, lost, winning, won, secured a victory, first period, second period, third period, final score . . . } Linguistically speaking the pairings may consist of subject/predicate pairs. A number of semantic variants will of course be included as well for such words/phrases. A combined term vector representing each respective row of interpreted documents may also be compiled for later reference. Again while shown in the context of a sports document analyzer, the same principles could be extended and used with any type of content to be analyzed for temporal qualities.

Figure 3:
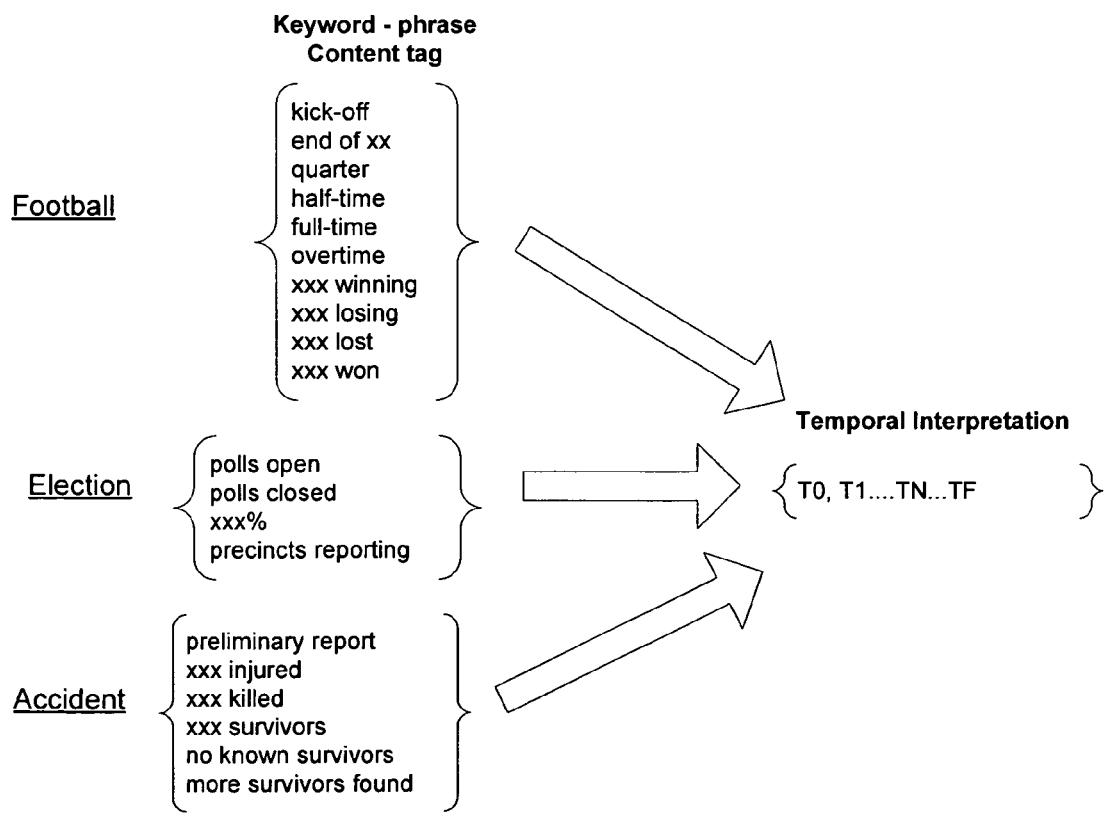
FIG. 3 illustrates a relationship between semantic tags and temporal interpretations for a particular topic/category of documents as utilized by embodiments of the present invention to classify documents and sort them in a temporal sequence.

Examples of keyword tagging and temporal interpretation are shown in FIG. 3. For each document category or topic, a set of keyword/phrase tags is developed, either explicitly or as part of a document decomposition process discussed above. These keyword tags are then mapped into a spectrum of temporal interpretations T0 through TF. It will be apparent to those skilled in the art that these are but examples, and that other tags could be used instead in these topics. Moreover, the identity of the keyword tags will obviously vary from topic to topic. It is possible that the content tags could also be comprised of other types of data, including images/graphics which can be characterized by suitable metadata that can function as content tags. Other multi-media data, for example audio can also be used since it can be converted into text as well.

In some instances of course the keywords may be dynamically and numerically linked to variables which change in predictable order. For example, a keyword/phrase may be in the form of "score is xxx-yyy" where xxx and yyy are variables which change with time according to an event score. This same concept may be expressed in many different ways of course ("home team is leading by a score of xxx to yyy" and the like).

Thus scores, event timers and related data may also be keywords. In the context of an election event, for example, the terms "xxx% of precincts" or "yyy votes" may represent keywords which changes and which are to be monitored, so that stories can be differentiated temporally simply by examining the respective % of precincts identified in the story, or by comparing the total votes counted. In this fashion a story which reports on a higher number of precincts or higher vote tally can be bumped ahead of earlier stories with smaller respective figures. Again similar concepts could be used in other fields where numeric variables (or semantic relatives) help to denote the progress of an event, such as when there are figures associated with event, as in the number of sets in Tennis, incident rates, the number of casualties in an accident/catastrophe, a number of products bought/sold, entertainment (movie/music) audience/box office figures, a number of shares traded, the date, a health condition, and other quantifiable physical variables (such inches of rain/snow and others which will be apparent to those skilled in the art).

In FIG. 1 at step 150 the system begins collecting a reference or seed set of new documents relating to one or more categories. Again, this can be done using any known technique, including the prior art algorithms noted above for the Google news compiler. The raw material for such stories can be extracted from a number of sources, including from search engines 151, blogs 152, other content aggregators 153 and miscellaneous sources 154, which could be message boards, RSS feeds, etc. As noted earlier in some applications the source could be text data derived from audio/graphics/video based files, including audio transcriptions, speech recognized data, or other metadata for such multimedia files.

The reference documents could also be sourced from a web page loaded in a user's browser. That is, while a person is reviewing an online document, the contents of the page (as well as other user interactions with the content, such as viewing, highlighting, etc) could be dynamically captured and sent as source material for the present invention. Other aspects of the person's session—such as a search query which triggered the page view and review—could be sent along as well. The search query could be analyzed to determine an appropriate topic/event or subject/predicate to be examined for temporal qualities. Based on this information the invention, as noted below, could return a set of results that are presented to the online viewer, preferably while they are still reviewing the electronic document (or related documents from a search). In this fashion the invention can instantly and dynamically inform a web surfer of more recent content dealing with the subject of the page.

The reference or seed set of new documents could also be based on spoken utterances which are recognized by a speech recognizer and then converted into text, or from SMS based text messages, etc. The utterances could be provided by users calling in to report on events as they happen, which can be exploited (as noted below) to gain more current information concerning localized events such as disaster, accidents, etc. The identity or calling region of a caller can be determined in any number of ways, including conventional caller ID mechanisms, ANI techniques, etc. This can be used to control/filter a set of incoming speech related reports, so that electronic documents based on persons reporting closer to the scene of the event receive priority in decoding (recognition) and temporal sorting.

The documents are then sorted by category by any convenient mechanism again as shown in step 160, to form categorized sets SD1, SD2 . . . SDM, etc. These can then be sorted by a scoring step 170 to determine a temporal order. This is also useful for determining the relative state of development of a new event which was not reported on before so there is no earlier known content.

Preferably the sorting is done in two different ways; a first sort is done to compare each document to a reference document set as established for the category in question as discussed above in connection with steps 130 and 140. This comparison can be done in any number of ways, including by checking for an overlap in keywords, a vector similarity computation, etc. In the final result a calculated temporal score can be identified for each new document based on a comparison to the prior reference sets. Based on this temporal score the documents are sorted and then placed into distinct temporal bins reflecting the temporal distinctions defined for such category.

Other techniques which are well-known in the art can be used as well, and it should be apparent that other benchmark/reference sets could be used to compare the new seed documents. The only requirement is that the algorithm be able to reasonably make a rough determination on which general temporal order a document should be classified into for a particular category—i.e., in one of the ranges Tfirst through Tlast. This completes a coarse sort.

One apparent advantage of the above approach is that duplicates of existing documents can be quickly identified and filtered. The removal of duplicate news stories, for example, would improve the look of a news aggregator significantly. It is conceivable for example that some threshold of content differences could be established to require that a document exceed before it is actually classified as a new member of the document set.

In any event after a coarse sort, any newly accepted documents within each temporal sorting bin are again sorted on a more granular level to compare them against each other. In this second scoring step, a natural language engine could compare pairs of documents in sequence to see if their respective order is correct, or if it should be switched. Again the interpretation intelligence used by the natural language engine should be geared towards providing higher scores for documents containing content reflecting later stages of the event in question. The programming for this can be achieved in any desired manner depending on the category of content in question. For example in the context of a hockey game, a particular story containing the terms/phrases won, lost, secured a victory, was outshot, etc., would be rated higher than a story containing the terms winning, late in third period, etc. Similar examples will be apparent to those skilled in the art for other types of content.

To further enhance the scoring, confidence levels and thresholds may be introduced at step 172. This can include additional factors such as examining a timeliness score for a source of the content in question. For example, certain new sources may develop reputations for breaking stories ahead of other entities. Over time a reputation or trust score can be established for certain documents based on their origin. The reputation/trust score can also be used to modify the temporal ranking of the document. This feature is elaborated and explained in more detail below in connection with FIGS. 4 and 5.

In other cases various forms of weightings may be employed at step 173, so that the presence of certain key terms is favored and scored more highly than for other content. For example certain verb forms may be highly favored when they reflect past tense, as opposed to an ongoing situation. These weightings can be used to modify the temporal ranking of documents.

At step 171, the system can then (optionally) output the result of a top N list (for example N could be 3, 5, 10, etc. depending on presentation limitations) to report on what it perceives to be the most current content on the topic in question. By including a reasonable number of candidates the likelihood is of course much higher that the most recent story in fact will be presented more readily. The ranking data can then be verified again, through another machine verifier of some kind (which could be another group of natural language examiners) or by human observation. The latter may be simpler and relatively easy to do by a trained team if the number of topics is not too large, and has the advantage again of being more accurate. The ordering could then be confirmed or modified as needed to create the initial ranked set of documents. Alternative embodiments of the present invention may employ a separate webpage or website whose members are allowed to rate the temporalness of documents, as seen and discussed in detail below in connection with FIG. 6. This has the advantage of potential increased accuracy as well as being attractive to certain types of Internet users.

Figure 6:
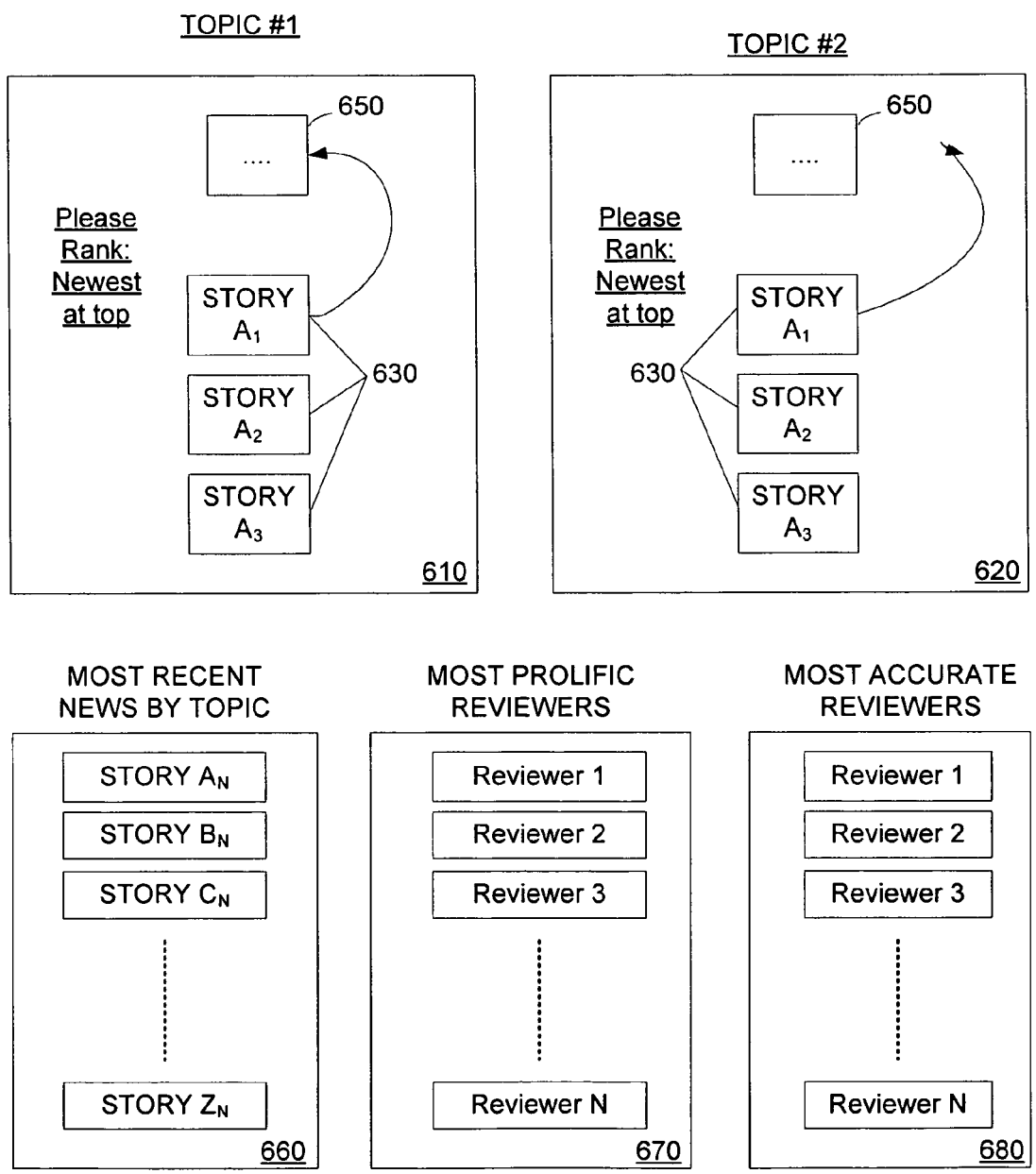
FIG. 6 illustrates a ranking system used in conjunction with the aforementioned document temporalizer of FIG. 1 and other related embodiments.

Returning to FIG. 1 at step 180 the ranked set can be presented as desired to persons viewing the aggregated news content at a conventional web page or web site as shown in FIG. 6. Furthermore the invention could complement the prior art approaches. That is, a webpage or website could be configured so that the content is presented in the typical prior art style (i.e., based on the relevant factors identified by Google) along with the temporal ranked style described herein.

One other application of the invention is as an automated document research/search engine. The above operations could be implemented in the form of a standalone software application or by a search engine that assists in finding and compiling content related to topics of interest to a user. For example to research a story about a past event, a user could specify different milestones in the form of textual expressions, such as: 1) Lincoln's birth; 2) Lincoln's childhood; 3) Lincoln's legal career; 4) Lincoln's legislative career; 5) Lincoln's presidency; 6) Lincoln's assassination, and so on. By using the milestones as a form of reference set, the invention can locate appropriate content in the desired temporal categories and match it to the user's desired temporal structure.

Conversely a user may be allowed to present a free-form expression of a desired history of an event, such as by presenting open ended queries such as "Tell me about Lincoln's life" or "what important events have taken place at this forum" and so on. The invention can be used to locate applicable documents, sort them temporally, and present summaries of the various periods covered to allow the user finer control. For example the documents may be analyzed and grouped automatically in distinct time periods (covering certain decades, certain cultural era (hippies, wars)) and presented to the user in summary groupings. In the open ended query example asking about Lincoln's life, the user may be presented with the specific categories for Lincoln as noted above. The user could then drill down and study the individual temporal categories as desired. Other examples will be apparent to those skilled in the art.

With respect to step 170, again in some instances of course it may be desirable to employ an algorithm which can perform a comprehensive scoring and sort in a single step. Thus either of the first or second steps could be omitted. Furthermore in some cases the seed set documents may consist of a single document for each category, in which case the comparison to the reference document sets (and to other documents in that category) may not be necessary.

Figure 4:
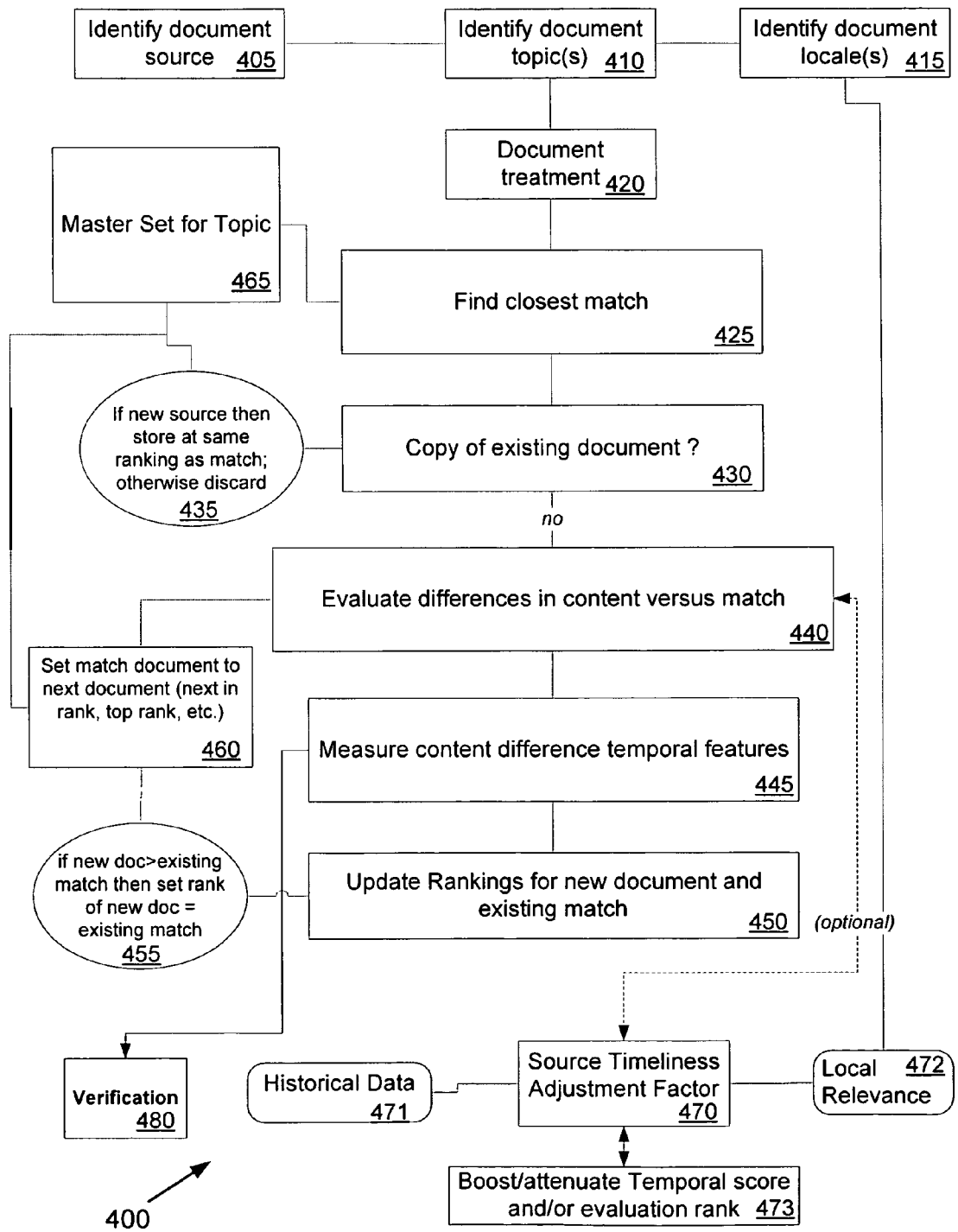
FIG. 4 illustrates the preferred steps performed by a document temporal analysis and scoring system and process which can be used in conjunction with the aforementioned document temporalizer of FIG. 1 and other related embodiments.

A more detailed breakdown of a preferred document temporal scoring process 400 which can be used in step 170 (FIG. 1) is depicted in FIG. 4. It will be understood that these are only representative of the types of operations which could be implemented. As with the temporalizing procedures noted above the operational steps of process 400 are implementable as one or more software routines executing on a data processing system that is coupled to the Internet.

At step 405 a source is identified for the document in question. This identifier could take any form suitable for expressing the origin of the document, be it from a Blog, a news agency, an email, etc. The document sources are catalogued and compiled for later reference. As noted herein, the sources are preferably correlated in a matrix/table (not shown) with the individual topics to identify a corresponding timeliness factor. Furthermore the sources are also associated in some cases with specific locales (see below) and such data can also be compiled in a cross reference table/matrix of any required form.

In some instances a source of a document may be difficult to attribute because there is no identified author/source. One option that may be employed in some instances is to use content/prose fingerprinting to determine a correlation between the text of the document and a group of authors. By cataloging the idiosyncrasies, mannerisms, word choices, word frequencies, etc. of particular authors it is possible to devise a database of author/content characteristic pairings.

That is, an author/source classifier can be trained from a corpus of materials in the same manner as the document classifier above. In this manner, when an unknown document is examined, a source classifier can analyze and determine a correlation and likely identity of a source/author of the document.

During step 410 the document is analyzed to determine one or more appropriate topics associated therewith, in a manner akin to that which was described above for steps 150, 160 above in FIG. 1. Thus this can be accomplished in any number of ways known in the art.

In step 415 the locale, situs or other regional specific information about the content or topic of the document is gleaned. For example in the case of a sporting event, the situs would be the name of the city where it is taking place. This would be true as well for stories involving natural catastrophes, accidents, disasters, etc. In some cases the information can be extracted directly from the document but in other instances it may be necessary to incorporate other geo-locating routines to place the locale of the event. This information is useful, as explained further below, for identifying potential sources of current information on the event in question as it is likely news reporters in such regions will be most active in covering the story.

Step 420 processes the document further to catalog and strip down the content into manageable form. For example the title, identified topics, content, related image data and the like are catalogued and formatted into appropriate form for use by later operational routines. At this time a tentative temporal ranking field can also be appended if desired.

The next operation which takes place at step 425 is a determination of a closest existing match to the document in question. This is done by referring to a preexisting reference set identified as master topic set 465 in FIG. 4. Again the process of determining such match can be done with any number of techniques known in the art and implemented as software programs for comparing and matching content of electronic documents.

At step 430 the process determines if the document under evaluation is merely a copy of an existing document. If so, then a notation is made to see if it is from a new source or not. Should it be from a new source the document is merely assigned the same temporal ranking as the predecessor document from a prior source. The collection of source information is thus useful for identifying a relative timeliness of specific sources for particular topics, and can be used as explained further below to enhance the efficiency of the system in locating temporally appropriate materials. If the document is instead merely a repeat from an already identified source it is simply discarded.

Figure 8:
Figure 8A:
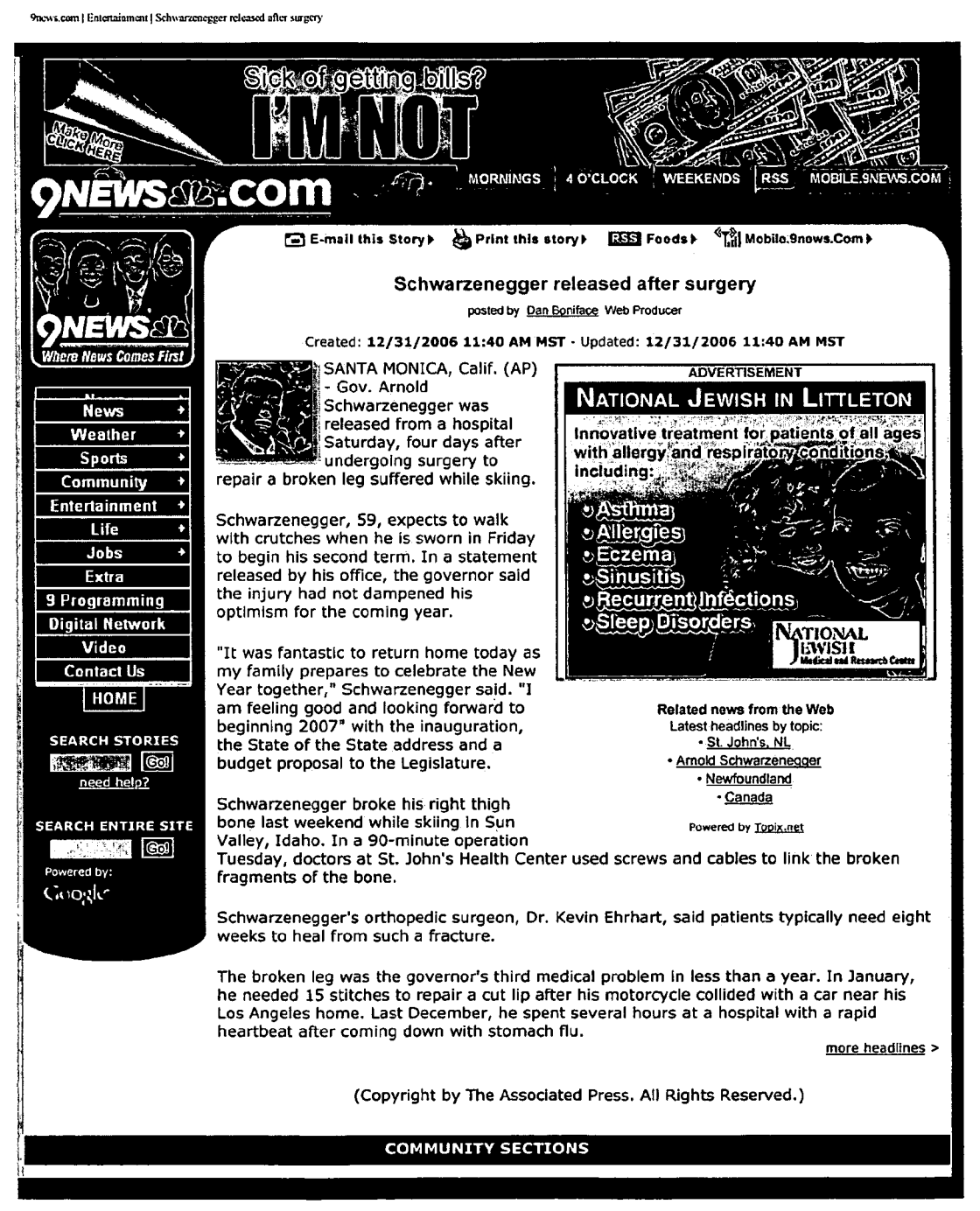
Figure 8C:
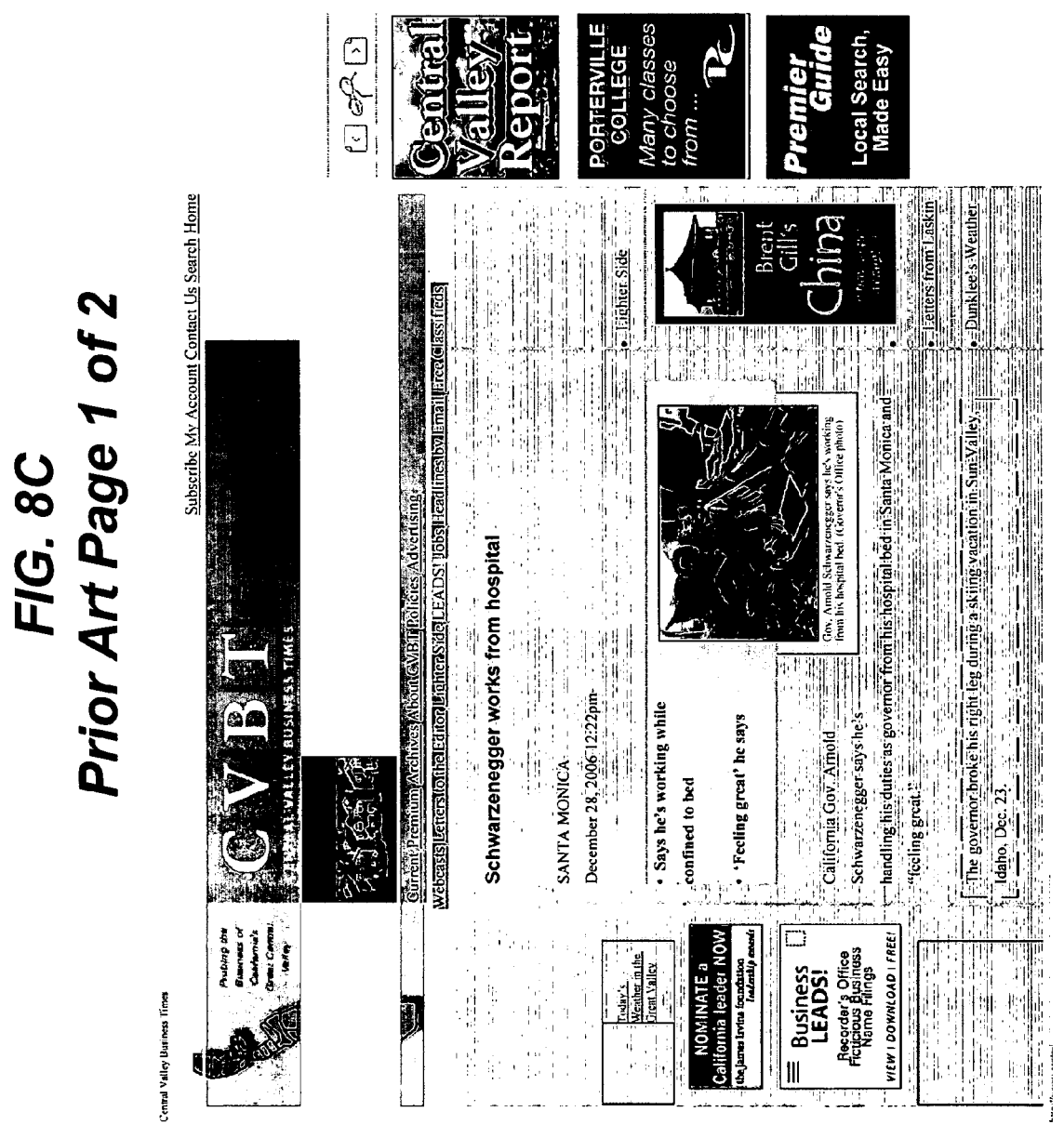

The ability of the present invention to quickly identify duplicates is handy because in many cases it can be used as a first-pass filter for eliminating documents which would otherwise clutter a news aggregator such as shown in FIG. 8. In other words in embodiments of the present invention the option to eliminate duplicates can result in a much more efficient use of available window/page space.

The next step 440 (optionally) computes the actual differences in content between the document and its closest match. The result of this is as alluded to above is to determine which classification to assign the document among the various options shown in FIG. 2. In other word, is the document A', A", A−B or A+B. This information can help to inform and adjust the temporal rank to be given to the document. As with the other processes described herein, the process of determining differences in content can be done with any number of techniques known in the art and implemented as software programs for comparing and matching content of electronic documents.

Step 445 measures the temporal differences between the document and its closest reference match. This can be done in a number of different ways. First, as mentioned above, a document may have its content evaluated as a whole and classified with a temporal interpretation based on content tags such as shown in FIG. 3. For documents in which the topic is relatively well-known and the stories tend to be similarly behaving with time, this is a relatively straightforward analysis. Thus the result could be that the document is given temporal ranking Tn. If Tn is greater than Tref, the latter being the reference match temporal interpretation, then the temporal rankings of the two documents are updated at step 450.

Another variation of the invention could use a different analysis in which content snippets in the documents are determined and tracked for temporal changes. This type of operation is shown with reference to FIGS. 4B, 4C and 4D.

In such type of approach content for a reference document 480 can be seen at the top of the figure. This content has a number of content snippets and tags which can be seen to provide useful guidance for later updates of the story in question, in this case an event in which a plane has gone missing. The content snippets 481, shown in boxes, are tagged automatically by a natural language processor or manually by a human operator, depending on the particular application. A conventional text/word parser could be used to shred the documents into individual words, phrases and sentences. It will be apparent that other content structures in the document, including images, graphics, audio data, and hyperlinks could be considered as well. Such items, along with any metadata associated therewith, can also be examined to determine their relative age and timeliness.

This initial document, offering breaking news on a particular event, thus affords a baseline for later comparisons. For example, a snippet can be comprised of a data entity of object/action pairs, preferably in the form of {Object, Status} constructs. That is, in entry 480, some examples could include {plane, lost contact); or {plane, missing} or {plane, efforts to contact} etc. Grammatically speaking, this analysis could be considered a form of subject/predicate analysis. Since many natural language engines are adapted to perform this type of linguistic analysis of prose, this affords a relatively simple way to identify items with variable temporal related behavior.

The temporal related content snippets can be stored in an updateable table which is constructed dynamically as documents are temporally decoded. Thus it could be in the form:

TABLE 2

TEMPORALLY RELEVANT CONTENT SNIPPETS

| ID | Object | Status | Age | Related to | Weight |
|---|---|---|---|---|---|
| 1 | Plane | Missing | 0 | 2 | High |
| 2 | Plane | Continuing Efforts to contact | 0 | 1 | High |

The age of the temporal content snippet can be used to determine a relevancy. That is, a snippet which is very old may be afforded less weight because it is not matched with other temporal content in subsequent documents.

The "related to" field can be used to correlate snippets. For example, a snippet that describes 350 passengers could be related to another later derived snippet which mentions 100 survivors, or another which describes a number of known fatalities. These relationships can be exploited to infer/fill in missing information that might not be expressly articulated in later documents. Thus a certain amount of metadata can also be constructed and organized for purposes of correlating temporal features.

The weight factor is related to the value of the snippet as a temporal predictor. This value is a function of how relevant a change in the status is relative to a real temporal change. In the example where an object (plane) changes status from missing (one state) to found (another state) the relationship is very strong and indicative of a temporal difference between two documents. This weighting factor can be assigned any of a number of different values, either numeric or quantitative, depending on the application in question.

All of the factors above could be determined again automatically by a content snippet routine, or by a human operator specifying the values.

Other formulations will be apparent to those skilled in the art and could be used to dissect and characterize the content of the document in a temporal fashion for later comparison. The objects need not be nouns, as shown above, and in some instances may consist of phrases.

Entries 482, 483, 484 and 485, are later updates/reporting of the events of the main story 480. These documents (shown here for simplicity in edited form of course) can be analyzed to determine if they have traces of the content snippets associated with the baseline document 480. Additional content snippets can be created as well to reflect new information gleaned in the updated stories.

Semantic supplementation can be employed (through the use of such tools as WORDNET) to assist in the temporal decoding process. Consequently in the present example, the term "plane" would be examined to determine semantic equivalents, such as "aircraft" or "flight." For larger linguistic structures, such as phrases, the FRAMENET tool (or others like it) can be used to determine semantic equivalents. This facilitates later comparison to other stories which use non-identical but semantically related content.

Thus for entry 482, it can be seen that the {plane, status} content snippet has a counterpart {flight, gone down} which suggests that the latter is more recent. Additional confirmation of the temporal change can be found in the other snippets of entry 482, which notes for example that a rescue is already underway, since "efforts to contact" can again be related to rescue. The latter snippet is particularly useful since disaster stories tend to fall along predictable story lines. Thus the presence of such content in entry 428 can be correlated with a reference set of disaster (or plane accident) related documents (see Table 1 above) to identify that it is later in time than a document that merely reports on a missing flight.

Entry 482 also shows additional snippets which are useful for later temporal comparison. Namely, new information is now available on the number of people onboard, and the identity of one of them. These can now be the subject of new subject and predicate pairings. This could be classified in the form of {carrying, 350 passengers} or {onboard, 350} or {passengers, 350}, and {Stink, onboard}. Consequently at the end of processing the content temporal snippet table associated with the document for entry 482 table 2 would look like this:

| ID | Object | Status | Age | Related to | Weight |
|---|---|---|---|---|---|
| 3 | Plane | Gone down | 0 | 6 | High |
| 4 | Passengers | 350 | 0 | None | Low |
| 5 | Stink | Onboard | 0 | None | Medium |
| 6 | Plane | Rescue begun searching | 0 | 3 | Medium |

In some cases it may be desirable to create a comprehensive master table combining entries from all entries. This can be used for determining an overall status of each type of temporal content, by disambiguating leaving single entries for each object. However for comparison purposes it may be useful to keep older metadata available for comparison.

From a comparison of the content snippet data for entry 482 and entry 481, a determination would be made by a temporal routine that the former represented content that is later in time. In a preferred approach the content snippets sharing common (and/or semantically related) objects and status types would be evaluated between the two entries. In this case, the table entries for "plane" would be evaluated, and a temporal decoder would determine that "gone down" (even qualified with "believe to have") is reflective of a later temporal state than "missing." Note that it could be compared with a different status type as well—such as "efforts to contact" if desired and the result would be the same.

The table entries for #2 and #6 would be determined to be semantically related, by virtue of the fact that "rescue" and "efforts to contact" would be phrases denoting similar concepts. Thus an evaluation of such semantically related entries would also yield a result that the former is a more recent term. Based on these evaluations the process would determine that entry 482 should be ranked with a designation indicating a more recent temporal value.

Similarly decoding of entry 483 reveals yet another content snippet related to plane (airplane) with the status "spotted"—which is semantically related to the concept of found. A new snippet is created for survivors in the form {survivors, looking for}. It should be noted that other snippets could be coded of course, and in different forms; these are but examples highlighted to illustrate the important aspects of the invention.

Entries 484, 485, 486 and 487 all show corresponding content snippets which can be matched to prior entry snippets. A comparison of some of the survivor content snips for example shows that a growing count can be attributed to a newer story. The update on Stink's status at entry 484 is another example. It can be seen quite clearly that comparison of temporal related snippets can yield reasonably reliable indications of the recency of documents, and the state of a particular event.

In some cases it will be apparent that there may be a many to one, or one to many relationship between temporal tags in different documents. This disparity in characterization of the state of the event can be exploited, of course, so that if one document only contains a single tag with an object specifying a particular state, and a different document has several which identify the identical state, then the latter may be considered more reliable of course with respect to the temporal state of that particular event at least. So the frequency and absolute numbers of object/state tags can also be used of course to determine temporal order.

FIG. 4C shows a similar evaluation of a story pertaining to a political election. The entries 488-493 are shown in temporal sequence for ease of understanding. It can be seen that by tracking content snippets 481 describing the state of the polls {will open} {open} {officially over}, precincts reporting {5%} {50%} {98%} {all} and vote tallies and percentages the correct temporal sequence can be determined for a set of stories.

Similarly FIG. 4D the evolution of a sporting event is shown with regard to a number of document entries 494-499. As with the other evolving stories described above, the content snippets 481 can be used to track the state of various objects such as a time of the game {will kick off} {intermission} {3 minutes to go} {end} and the home visitor score {none} {0-7} {17-10} {27-31}.

It will be understood again by those skilled in the art that other concepts/objects would be appropriate for other types of events.

Returning to FIG. 4 after the temporal ranking of the document is completed at 450, it is ranked and compared as noted in step 455. If the new document has a higher temporal rating is then ranked higher than its closest counterpart then it is assigned a rank equal to such counterpart while the latter is demoted. Otherwise it is assigned a ranking equivalent to a document in the master set 465 with the same temporal rating. In some cases it may be desirable to fine tune a rating by comparing such new document with the closest temporal match again by repeating steps 440-445-450.

At step 460 the process then proceeds to select the next highest ranked document for comparison purposes with the new document. This next highest ranked document is then matched against the new document using steps 440-450 once again to determine a temporal winner. The process is repeated until there are no further ranked documents to compare against (i.e., the new document is declared as the most recent document on the event) or the new document fails to displace a prior ranked document. In any event the new document, its temporal rating and its ranking are then listed in database 465. In addition a source field and database associated with the document is updated to reflect the attribution of the temporal rating and ranking to a particular source. In this manner the behavior and performance of specific sources can be evaluated and rated over time as well on a topic by topic or story by story basis.

Other optional features which can be implemented in the above process include a verification step 480 which is explained in further detail with reference to FIG. 5. This additional verification may be useful in those instances where a document achieves a highest temporal ranking rating and a double check may be in order to provide additional assurances of its temporal value.

Another optional feature is shown beginning with step 470 in FIG. 4. In this operation additional weighting/adjustments for the temporal rating can be given based on the value of the source providing the document. For example historical data 471 is consulted to identify prior temporal ratings and rankings achieved by the source in question for the document. In addition a local relevance score is computed at 472 based on a comparison of a situs of the event and a situs/associated geographical region of the source in question. For example, for a story about an accident in South Carolina, a station issuing reports from Charleston would receive a higher rating than a similarly situated station in California reporting on the same event.

Accordingly at step 473 a temporal rating or a document ranking may be boosted or attenuated depending on the source timeliness evaluation. It should be noted that other factors may also be considered, for example sources could also be measured and compared for their output on stories on particular topics. Over time a database or other correlation table could be developed that identifies sources known to be prolific on particular subject matter areas (sports, finance, politics, cultural events, entertainment, etc.) This prolificness factor, or fluency factor may be associated with particular interest or expertise of the reporters, writers or audience associated with the source, and can be used again to modify a temporal ranking score.

To facilitate source timeliness adjustments, it may be useful to compile a list of sources associated with particular geographic regions. For example all the TV stations and newspapers within a certain radius of major cities, or within a radius of a set of coordinates. By identifying and ranking a set of sources in advance—by examining historical behavior—the computation and adjustment can be expedited considerably.

Furthermore by identifying a situs of an event it may be beneficial to focus attention and computing resources to monitor other geographically similarly situated content sources as most likely originators of current material. Thus in the various operations noted above, such as steps 140, 150 (FIG. 1) the search collection process could be focused and weighted more heavily to local sources associated with the event. This is because, in large part, breaking stories in particular locales are likely to be released to reporters/journalists which are well-known in that community due to personal familiarity. Such local reporters are likely tend to know their areas better, and are likely to know where to go to gather current information.

The ratings forum (discussed below) could be similarly tailored on a demographic/geographic basis so that content on particular topics germane to local events is presented to users in such area. This increases the chances that persons with direct knowledge can participate in the authentication process.

A simple example of the value of the source timeliness factor can be seen in FIG. 4A. On this date (Aug. 4, 2007) at 8:40 PST, there is only a single news story describing a situation in which a potential bomb threat was discovered in South Carolina. The news story was generated by WXLT, a TV station in South Carolina. From this and hundreds of other available examples it is apparent that local news agencies can be a prime source of breaking news on local topics.

Figure 5:
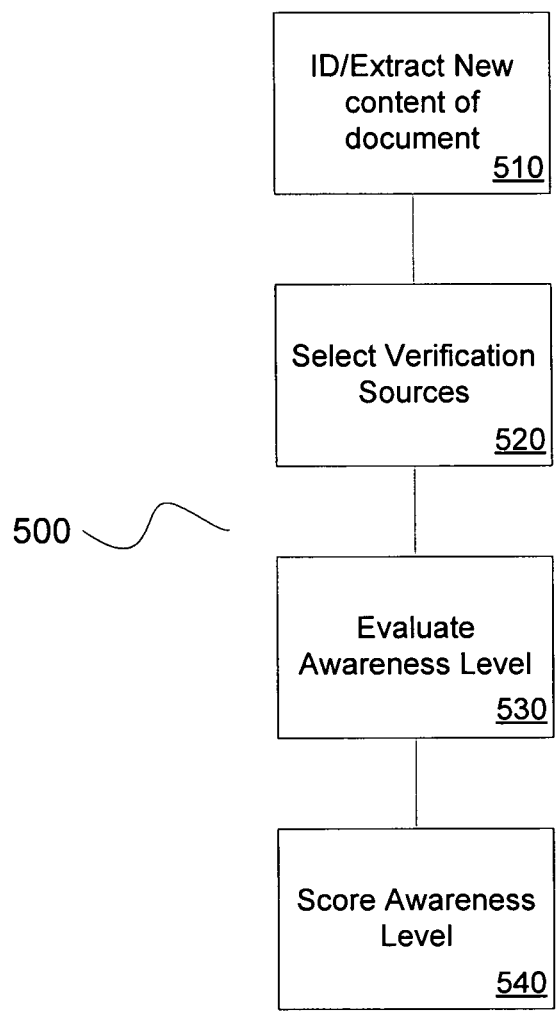
FIG. 5 illustrates the preferred steps performed by a verification process which can be used in conjunction with the aforementioned document temporalizer of FIG. 1 and other related embodiments.

FIG. 5 illustrates an optional verification process 500 which can be used in conjunction with the aforementioned document temporalizer of FIG. 1 and other related embodiments. The verification process, as mentioned above in connection with FIG. 4, can be used as a supplemental support mechanism to determine the relative recency or freshness of new content. The basic principle of this process is that the awareness/prevalence of certain content across a certain domain can be reflective of its recency. That is, with all other things being equal, if certain content on a topic which is believed to be relatively new can be found in fact in only a fraction of certain benchmark sites, then this can be considered a reasonable indicator of its freshness.

At step 510 the new content of the document is extracted. For example, in a story about a sports game, the new content might include the content "ABC University has won the game against XYZ Tech." In the verification process it may be desirable to use more than just the new temporal related content to increase the query coverage.

During step 520 a set of verification sources is selected to serve as the domain for the verification check. The verification sources, like the local sources noted earlier, are preferably determined in advance based on their historical performance as reliable indicators for the topic in question. As an example, for a sports story dealing with football, it may be empirically determined that certain message board posters on a social networking site are known to publish and post results of sporting events very early compared to other sources. Consequently the verification sources can include search engines/indices, other news outlets, RSS feeds, web logs (Blogs), social networking site pages (including personal profiles, private message walls, etc.) message board sites, etc. Other examples will be apparent to those skilled in the art as they materialize on the Internet. Again, for reasons which are self-apparent, these same verification sources often afford an excellent source for finding new materials as well for use in the front end selection of the reference seed set (FIG. 1).

At step 530 an awareness or prevalence rate of the new content is measured in the domain. As an example, consider the story noted in FIG. 4A discussed above. It can be seen in FIG. 5A that a search within the Google domain for the terms "Goose Creek Bomb" reveals a number of new pages created within a short period of time which appear relatively high on the search list. Thus it can be determined with some reasonable certainty that the story is legitimate, it is timely, etc. Other sources could be explored as well.

If desired, an awareness or prevalence level or rating can be computed as well at step 540 for the new content. This can be used, again, to determine if the content is authentic, reliable, or truly recent. For example, if the content elicits a very large number of hits, this could indicate that the information is in fact already well-known/disseminated, and thus actually stale. Conversely a small number of hits within the domain might be construed as an extremely new story based on the relatively small dissemination across the domain(s).

To improve accuracy the verification process could be executed at different times to compare scores at different intervals. A story which is rapidly changing in prevalence in a short period of time may be inferred to be relatively recent in many cases.

FIG. 6 illustrates a web page interface 600 that can support a verification process as well (FIG. 1 reference 171 and FIG. 5). The interface is used to gather and present information to Internet users concerning news stories or other documents relating to particular topics. Since it relies on participation by real users to rate/rank documents or stories it can be seen to be implementing a ratings booth for persons to express their opinions. The ratings booth can be integrated within a portal (such as the types offered by such companies as Google, Yahoo!, Microsoft, AOL, etc.) or some other content provider website (such as Motley Fool) or as an application that is used by members of a social networking site, or even provided as part of a standalone website which provides leading edge news.

Regions 610, 620 are used to present headlines of stories (A1, A2, . . . etc.) pertaining to particular topics. These stories are selected as part of the top N list described above; while only 3 entries are shown, it will be apparent that any reasonable number of stories appropriate for the interface can be presented. The interface collects data by allowing users to rank the stories relative to each other within regions 610, 620 respectively. The documents are readable by the users by simply selecting a URL embedded in the story field (not shown). A separate viewing window (not shown) could be used to peruse the story and comprehend the content. The story headlines and a brief synopsis may be presented within fields 630.

After viewing the same, users can indicate their opinion/belief on the relative recency of documents/news stories by ranking them in order from top to bottom. This can be achieved by simply dragging and dropping the stories in a particular order. For example the interface could require that users identify the most recent story by placing it at the top slot 640. Alternatively a checkbox could be placed next to each to indicate a relative temporal rank, or a simple indication of the most recent one in the group.

It is not necessary of course for users to rate all the stories. Simply expressing an opinion, however, concerning their impression of the most recent story can nonetheless be extremely valuable. The topics can of course be customized and set up to particular user preferences. For instance a person interested in sports and finance could select such type of content to be presented within regions 610 and 620. Again while only two regions are shown it will be clear to skilled artisans that more space could be dedicated to such function.

Based on the user voting for the stories, a sorting routine (not shown) can then tabulate the data and present the results in region 660 for public viewing. The ranking data for this same list of stories can be communicated by the sorting routine to the other routines used by the processes of FIG. 1 and FIG. 5 respectively above. The sorting routine can be implemented in any number of ways appropriate to a particular environment by one ordinarily skilled in the art.

A separate reviewer tabulating routine (not shown) can then tabulate the data concerning the most prolific reviewers and present the results in region 670 for public viewing. This data is merely used to recognize the contributions of reviewers who are assisting the ranking process, and can be used to induce participation by users. Other inducements could be offered as well depending on the nature of the particular portal/website implementing the present invention, or the interests of an operator of the same.

Similarly, a separate reviewer accuracy tabulating routine (not shown) can then tabulate the data concerning the most accurate reviewers and present the results in region 680 for public viewing. As above, this data is used to recognize those reviewers whose contributions to the ranking process are determined empirically to be most accurate from a temporal perspective.

The ranking data for this same list of stories can be communicated by the sorting routine to the other routines used by the processes of FIG. 1 and FIG. 5 respectively above Region 670 is reserved for presenting the As with the sorting routine these tabulating routines can be implemented in any number of ways appropriate to a particular environment by one ordinarily skilled in the art.

In some embodiments it may be desirable to bias and customize topics presented to users based on their particular geographic area. Dedicated areas may be used as well based on interface configurations selected by the user. For example for a reviewer in Florida the Sports topics stories may be more weighted on Florida based teams. This may increase the enjoyment of the site for those viewers who prefer local stories. In addition the opportunity for local users to modify document rankings for stories in their respective geographic locales effectively converts such persons into informal reporters of sort who contribute to the accuracy and timely delivery of information for that region. In addition individuals could be targeted based on their bookmarks, or queries made in the past, to determine their usefulness as validators for the topic, event or geographic region in question. In social networking applications, individuals could be solicited to become part of topic based "reporting" groups to help contribute and refine content for the community's benefit. Members can also subscribe to individual news "channels" on specific topics that are stocked in part with content contributed (or culled from other sources) by other members.

Other uses of the invention will be apparent to those skilled in the art. For example, one current line of research is heavily focused on personalizing search results for user queries. The ranked temporal list of stories by topic identified above in region 660 by the present invention could be used by search engine operators to modify and/or enhance search results. Consideration could also be made, of course, of the geographical source of the query as can be done by any number of conventional search engine routines. For example a person entering a query directed to certain key words such as "airplane accident" in the vicinity of the story discussed above in connection with FIG. 4B is more likely interested in the local breaking story than on general information relating to aviation safety. By consulting the most recent temporal information relating to an event the relevance of search results is likely to increase as well as many people are reacting to the rapid dissemination of information.

In similar fashion a recommendation engine could also be programmed to consult with the temporal ranked list of topics/stories to render a recommendation to a user concerning an item, such as a book, a television program, a movie, etc. For example if a local story on an airplane crash is heavily followed and rated with a high temporal ranking a television guide recommender may automatically record the next available news report for a user. Similar recommendations can be accommodated for other scenarios.

For certain embodiments of the invention it may be desirable to predict in advance the expected progress of a particular story. This prediction can be used to form queries targeted in specific domains to identify and mine more content.

For example certain stories involving natural disasters, accidents, etc., tend to follow predictable patterns in terms of the evolution of the story. This basic pattern can be exploited. One example is an earthquake related event. Typically speaking the first stories report solely on the detection of the event. Then later there are usually stories indicating the magnitude and epicenter. Still later come reports on damages, casualties, etc. From this known pattern a query formulation routine can in effect predict or speculate on the nature of subsequent stories pertaining to a particular event. In other words, if a hot story is found relating to an earthquake, a query formulation routine can consult various reference sources (the USGS for example) to identify the location, for instance San Francisco Calif.

From there the query formulation engine could be begin to conduct searches in any desired domain (search engines, message boards, blogs, broadcasts, social network sites, etc) for keywords by incorporating known phrase terms such as "earthquake San Francisco {date}" and integrating them with expected phrase terms such as "magnitude" or "epicenter" or "casualties" or "damage" etc. This is but an example of course, and other stories would be predicted in accordance with a template/pattern developed for that type of event. As an example, for a sporting event which is known to end at a certain time, a series of searches could be conducted with alternate predictions which cover the gamut of possible outcomes, such as "ABC University wins" or "ABC loses game against XYZ" or "XYZ wins" etc., etc. This prediction technique has the advantage of exploiting the potential current coverage of a search engine which can extract the data from unrelated sources in a more timely fashion than a dedicated software robot which is searching and compiling data from multiple sites.

As noted above many natural disaster stories can be anticipated to some extent by their very nature. Thus for an earthquake centered in a particular area, it may make more sense to tap into content sources local to such event. In the case of a hurricane, a weather center could be consulted to determine an expected path of the storm. This path information could be used again to target local media reporting sources to increase the relevance and timeliness of information.

For other planned events, such as sports, political summits, entertainment related, etc., similar types of predicted news stories could be tested to identify actual relevant content as it is just coming into existence.

A further source of information that can be exploited are close captioned television broadcasts, podcasts, RSS feeds and similar data feeds which can include text (or audio that can be recognized). These can afford additional opportunities for recovering timely data.

The invention could also be used in connection with systems which monitor activity in message boards, Blogs, RSS feeds, social networking sites, etc. In such instances the invention can be assisted by a polling routine which operates periodically to scan and retrieve content from particular designated sites, in a manner similar to that shown and disclosed in U.S. Pat. No. 6,493,703 incorporated by reference herein. This polling can be done on a topic or event basis, and such topics/events can be determined automatically based on the content of a web page/site in question (in a manner similar to that done by implementations of Ad Sense™—a Google ad serving technique). For example, a fan site dedicated to the Boston Red Sox baseball team may have a dynamic list of message board posts, blogs, etc., with current news on the team, specific players medical conditions, scores, etc. The same technique could be incorporated in message board systems devoted to particular equities; that is, a list of top stories reflecting the status of some company event (earnings, product releases, court results) could be maintained for the pleasure of the board participants. A social networking site could have programmable pages, so that users could elect to designate certain areas of interest which they would like to see updated periodically to reflect the most current state of knowledge of the social networking site itself, or beyond such domain if required. The advantage of the invention is that it becomes possible now to identify particular third party sources that are most apt to produce timely content on particular topics/events such as bloggers.

Alternatively the topics/events could be explicitly specified by a visitor to the web page in question. In the above example a user could type in a search pertaining to a particular player's status, and the present invention would poll a specified target list of sources to determine a best answer to the user's query. The frequency, sources, topics, etc., could all be programmed based on the nature of the content served by the site/page in question.

In a social networking application, the individual personalized pages on a website could be examined. One possibility that has not yet been exploited is cell phone and other audio based communications between individuals. In a collaborative environment some individuals may choose to permit broadcasting and/or monitoring of their communications, including text messages, for public consumption. The motivations for doing so will vary in accordance with each application, but again suitable inducements may exist for allowing such types of ecouterisms. By tapping into such communications, and decoding them into text streams, it is possible again to derive another source of event related data.

Search engine results could also be modified in accordance with a temporal characteristic. It is known in such field of art to try and determine the time/age of particular pages through explicit time stamps to help prioritize and provide a different look for search results. As with publication/release times for articles, time stamps do not necessarily reflect current conditions of an event. The same is true with respect to message board systems, where people frequently repeat old content and new content becomes buried under an avalanche of old information. The present invention could be used in lieu of or in addition to such techniques, so that the search results are parsed and analyzed to determine their relative temporal order relative to a topic/event determined by the search engine from the user's specified query text ("who won the TX election", "what were X's earnings") or relative to a topic/event gleaned by the present invention when examining the actual search engine results.

Figure 10:
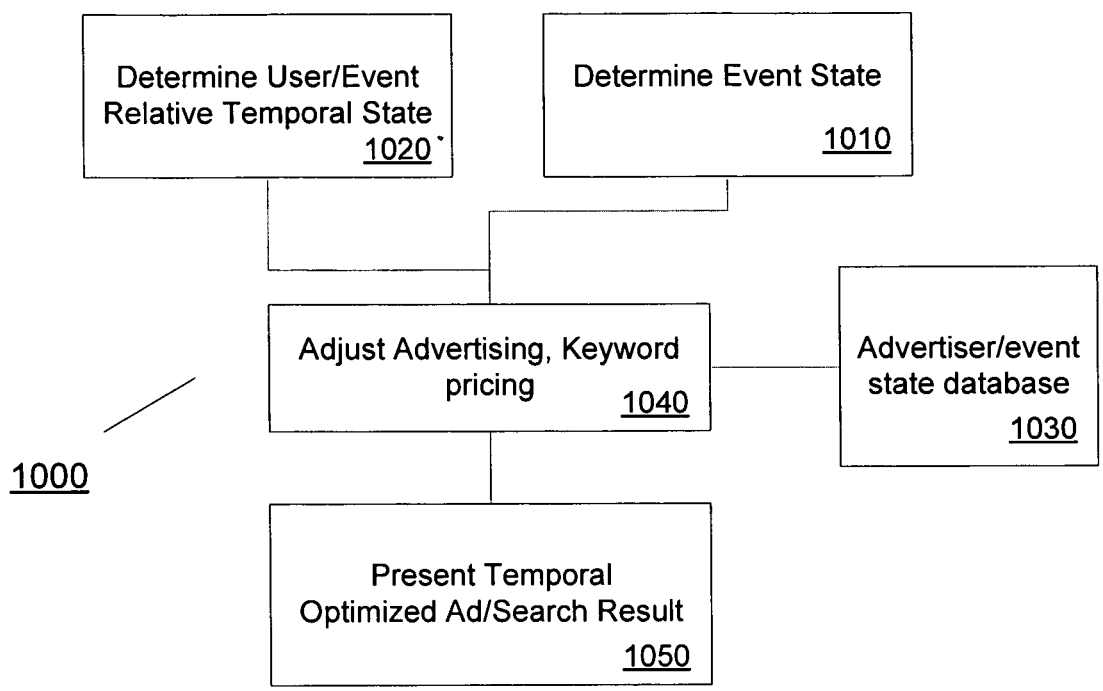
FIG. 10 depicts operation of a search/advertising engine implemented in accordance with teachings of the present invention.

As seen in FIG. 10 an electronic advertising process 1000 can also be affected and modified by temporal parameters of documents. For example an online content presenter may note that a user is reviewing a set of documents on a topic in a particular temporal order. The advertising presented to such user can be selected/adjusted in response to determining a temporal parameter of a document being presented.

For example at 1010 a user reads that the status of a hockey game is at an intermission with his favorite team winning. This temporal (and current outcome) state of the event can be used to influence the type of advertising presented to the user at 1050, since individuals tend to have particular psychological associations with sporting event breaks, team successes, etc. and other products Many alcoholic beverage companies tend to present television advertising during such occasions. Other examples will be apparent to those skilled in the art based on basic market research, and based on an expectation of a user's mental state/demeanor during review of content.

Furthermore (and as a complementary approach) it may be determined that an event has terminated, but that the user has not completely reviewing content on a particular matter as shown at step 1020. Since it can be expected that the user will eventually discontinue their browsing on the subject upon reaching the end of a temporal state for the event, the auction algorithm for an advertising engine can be optimized at 1040 to adjust pricing of keywords/ads to such individual. This same principle can be applied at any stage of the user's review of content to dynamically price the cost of advertising/keywords.

Thus prices for ads presented early on in a session can be priced differently than ads presented later in a session, based on an advertiser/event state database 1030 for ads/keywords. This is similar to pricing models used by television advertisers, who typically receive different price points for content presented at different stages of an event. Because the invention can be used to determine a temporal review state by the user (including a relative temporal order relative to a final state, the rate of consumption of material by the user and the amount of material still left to be reviewed) a prediction can be made of the user's expected overall session time on such topic. By adjusting an advertising price in accordance with a user's expected session time, and on a topic by topic basis, the invention can improve advertising effectiveness, budgeting, etc. Accordingly advertisers can be presented with options/keyword variations for presenting ads at different temporal session states (when the user is reviewing content for a completed event), or based on certain event states (i.e., at the beginning of a game, as compared to an end of a game).

Again this same principle can be applied to search engine behavior as well, so that queries for a topic are processed in part based on determining a current state of awareness by a user of content for an event, and attempting to present him/her with more relevant information based on identifying such state. Therefore an individual making a query at time T for an event, and presented with a certain amount of content, can be expected at a later time T1 to have an awareness of a state of the event from the earlier time. For such person it may make sense in some cases (or at the user's option) to only present information for the more updated state of the event as seen at 1050.

Finally, it will be apparent to those skilled in the art that the methods of the present invention, including those illustrated in the above figures can be implemented using any one of many known programming languages suitable for creating applications that can run on client systems, and large scale computing systems, including servers connected to a network (such as the Internet). Such applications be then be embodied in tangible, machine readable form for causing a computing system to execute appropriate operations in accordance with the present teachings. The details of the specific implementation of the present invention will vary depending on the programming language(s) used to embody the above principles, and are not material to an understanding of the present invention.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of automatically training an electronic document sorter with a computing system comprising:
   a) identifying a first set of electronic documents containing content associated with a set of topics using the computing system;
   wherein said content describes one or more events related to one or more topics;
   b) analyzing said first set of electronic documents to identify first temporal components for each of said one or more events and one or more topics;
   wherein said first temporal components include content other than but not excluding date/time data specified for said first set of electronic documents, including text words and semantic equivalents of such text words;
   c) assigning a first set of corresponding temporal scores to said first set of electronic documents based on analyzing said first temporal components, said first set of temporal scores representing a first set of chronological states of said one or more events for said one or more topics described in said first set of documents,
   wherein said first set of corresponding temporal scores are provided by automated and/or human based input scoring;
   d) training an automated document classifier using said temporal components; wherein the automated document classifier is adapted by such training to classify and assign a second temporal score to an unclassified electronic document containing content associated with the first event related to a first topic based on temporal characteristics analyzed for such unclassified electronic document, including second content other than but not excluding second date/time data including second text words and second semantic equivalents thereof representing a second set of temporal components contained in such unclassified document;
   wherein said unclassified document is ordered in time relative to said first set of documents with respect to at least said first event based on said second temporal score.

2. The method of claim 1 wherein said second temporal score indicates a specified action in a sequence of actions taken by a subject of said first event.

3. The method of claim 1 wherein said automated document classifier is further trained to determine an event associated with an unclassified electronic document, and receives temporal component information from a reference document set containing reference temporal data corresponding to predicted content for said event.

4. The method of claim 3 wherein said predicted content includes one or more objects and related object states for said predicted content.

5. The method of claim 1 wherein said first temporal components are derived from annotations and/or codings made to such first set of electronic documents provided by a human reviewer.

6. The method of claim 1 wherein said first temporal components are derived from annotations and/or codings made automatically to said first set of electronic documents by a text parser.

7. The method of claim 1 wherein said automated document classifier is adapted to use semantic data for a sport event content associated with said unclassified electronic document.

8. The method of claim 1 further including a step tuning said automated document classifier with additional temporal related data for a class of events derived from a subsequent set of electronic documents relating to such class of events.

9. The method of claim 1 wherein said events are sports related, natural disaster related, accident related, political election related, and/or financial market related.

10. The method of claim 1 wherein said automated document classifier is used with an automated news aggregator executing on a web site.

11. The method of claim 1 wherein said automated document classifier is used with a search engine.

12. The method of claim 1 wherein said automated document classifier is used with a recommender system.

13. The method of claim 1 wherein said temporal components are stored as selected content depicting separate sequential temporal states of said event.

14. The method of claim 13, wherein said selected content also includes variable data designed to accommodate data which indirectly indicates a temporal state.

15. The method of claim 14 wherein said variable data relates to one of at least a sporting event score, a number of persons in a disaster or accident, an election result, a movie box office total, a number of shares traded, a medical condition, and time dependent physical variables.

16. The method of claim 1 wherein said electronic documents are based on transcriptions of speech recognized utterances.

17. The method of claim 1, wherein step (b) is performed by analyzing browsing behavior of users reviewing said first set of electronic documents.

18. The method of claim 1 wherein said steps are implemented as one or more computer software routines embodied in a tangible media and adapted to cause one or more computing systems to perform the operations recited therein.

19. The method of claim 1 wherein automated document classifier generates a temporal template for each of said one or more topics, such that a plurality of temporal states are mapped to a plurality of respective content items.

20. The method of claim 1 wherein said electronic documents are based on a transcription of an audio/video file and/or metadata associated therewith.

21. The method of claim 1 wherein an author and/or a locale associated with said documents are also identified and classified with said documents.

22. The method of claim 1 where said first temporal components for each of said one or more events and one or more topics are identified by classifying content differences between documents.

23. A method of automatically training an electronic document sorter with a computing system comprising:
   a) identifying a first set of set of electronic documents containing content associated with a set of topics using the computing system;
   wherein said content describes one or more events related to one or more topics;
   b) sorting said first set of electronic documents in temporal order with respect to each of said one or more events and one or more topics to form at least one sorted topic/event document set using the computing system;
   wherein said first set of electronic documents are sorted and annotated by a combination of both human and an automated text parsing;
   c) analyzing said at least one sorted topic/event document set using the computing system to identify temporal components relating to the topic/event of each electronic document which correlates to a temporal rank of such electronic document with respect to the topic/event;
   wherein said temporal components include temporal data including text words other than but not excluding date/time data;
   d) training an automated document classifier using the computing system to automatically identify second temporal components in other electronic documents associated with a particular event/topic and which are not part of said sorted topic/event document set;
   wherein said second temporal components also include semantic equivalents of said text words;
   e) collecting a new set of documents and determining a reputation/trust score based on the origin of the new set of documents;
   f) ranking the new set of electronic documents using said automated classifier and said reputation/trust score to determine a temporal rating of each document relative to an event or topic, which temporal rating defines a relative chronological sequence of such document for said event or topic relative to other documents in said new set; and
   g) selecting at least some of the documents with a highest temporal rating and outputting them in a form suitable for review by a human reviewer.

24. The method of claim 23 wherein said first temporal components include semantic equivalents.

25. The method of claim 23 wherein an author and/or a locale associated with said documents are also identified and classified with said documents.

26. The method of claim 23 where said first temporal component are identified by classifying content differences between documents.

27. The method of claim 23 wherein said steps are implemented as one or more computer software routines embodied in a tangible media and adapted to cause one or more computing systems to perform the operations recited therein.

* * * * *